United States Patent
Kvasnica et al.

(10) Patent No.: US 12,217,326 B2
(45) Date of Patent: Feb. 4, 2025

(54) IDENTIFYING APPLICATION BUFFERS FOR POST-PROCESSING AND RE-USE IN SECONDARY APPLICATIONS

(71) Applicant: NVIDIA Corporation, Santa Clara, CA (US)

(72) Inventors: David Kvasnica, Ontario (CA); Adrian Jerod Wells, Snellville, GA (US); Jeremiah Gustaf Ingham, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 204 days.

(21) Appl. No.: 17/824,387

(22) Filed: May 25, 2022

(65) Prior Publication Data
US 2023/0385983 A1    Nov. 30, 2023

(51) Int. Cl.
G06T 1/60 (2006.01)
G06N 3/084 (2023.01)
G06T 1/20 (2006.01)

(52) U.S. Cl.
CPC ............. *G06T 1/60* (2013.01); *G06N 3/084* (2013.01); *G06T 1/20* (2013.01)

(58) Field of Classification Search
None
See application file for complete search history.

(56) References Cited

U.S. PATENT DOCUMENTS

| 2016/0163087 A1* | 6/2016 | Cho | G06T 11/40 345/420 |
| 2022/0198622 A1* | 6/2022 | Kumar | G06N 3/063 |

* cited by examiner

*Primary Examiner* — Yi Wang
(74) *Attorney, Agent, or Firm* — Lowenstein Sandler LLP

(57) ABSTRACT

Apparatuses, systems, and techniques for buffer identification of an application for post-processing. The apparatuses, systems, and techniques includes generating a buffer statistic data structure for a buffer of a plurality of buffers associated with a frame of an application; updating the buffer statistic data structure with metadata of the draw call responsive to detecting a draw call to the buffer; and determining, based on the buffer statistic data structure, a score reflecting a likelihood of the buffer being associated with a specified buffer type.

18 Claims, 15 Drawing Sheets

IDENTIFYING APPLICATION BUFFERS FOR POST-PROCESSING AND RE-USE IN SECONDARY APPLICATIONS

TECHNICAL FIELD

At least one embodiment pertains to processing resources used to select a buffer of an application (e.g., a gaming application) for another application (e.g., an application performing post-processing operations). For example, at least one embodiment pertains to processors or computing systems used to identify, via statistical analysis, a buffer of a specific type for an application performing post-processing operations, according to various novel techniques described herein.

BACKGROUND

Typically, the display of a main application content (e.g., game output) is standard for all users. Third-party applications provide users the ability to customize the appearance of the game output through real-time post-processing. For example, the post-processing may include applying filters to enhance color and contrast, color adjustments for color-blind users, and other modifications to objects and/or colors within the game output.

BRIEF DESCRIPTION OF DRAWINGS

Various embodiments in accordance with the present disclosure will be described with reference to the drawings, in which.

DETAILED DESCRIPTION

Figure 1:
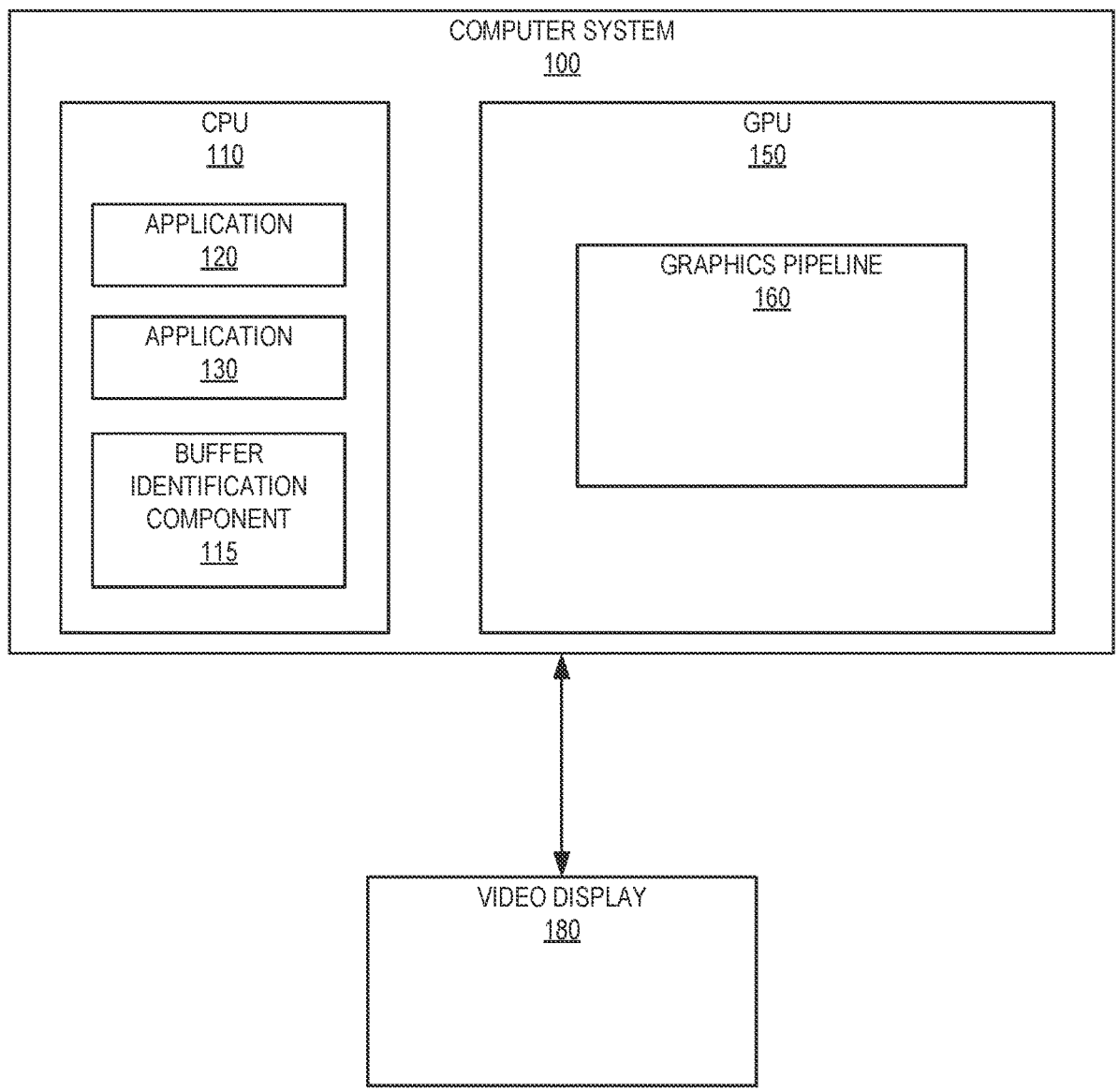
FIG. 1 is a diagram of a computing environment for identifying, via statistical analysis, a buffer of an application for post-processing operations, according to at least one embodiment.

Generally, every visible portion of a frame in a main application (e.g., a gaming application) is sent to a graphics processing unit (GPU) to be drawn (e.g., via draw calls). A draw call is a call to a graphics application programming interface (e.g., graphics API) to draw objects (e.g., draw a triangle) on a video display. In particular, the draw calls may provide the GPU with vertex information for each object to be drawn. A plurality of buffers of the GPU may be bound to the main application to receive the draw calls used to draw the objects. A buffer is a portion of random-access memory (RAM) accessible by both the CPU and the GPU and containing data to be processed by the GPU or rendered by a video display. The plurality of buffers may include at least one colour buffer and at least one depth buffer. For example, depth buffer or z-buffer may be used to represent data associated with the depth of objects in the frame. Based on the buffer, a draw call with corresponding data, such as colour data, depth data, etc., can be created by the GPU to draw objects of the frame on the video display. According to a state of a graphics pipeline of the GPU, the main application can indicate what type of data a buffer is designated to receive, and the GPU can create corresponding data (e.g., depth data, colour data, etc.) to accompany the draw call. Accordingly, if the buffer is designated to receive depth data, depth data can be generated to accompany the draw call, or if the buffer is designated to receive colour data, colour data can be generated to accompany the draw call. Typically, detrimental costs to the performance and memory usage of the GPU can be avoided by reusing bound buffers for a single frame, thus avoiding repeated allocation and maintenance of too many bound buffers.

The main application may send a plurality of draw calls (e.g., 100 draw calls), each providing a 3D vertex coordinates. The GPU may draw the objects (e.g., triangles) using the colour data placed in the colour buffer. Additionally, the GPU may draw the same objects using the depth data (e.g., depth of the object's pixel relative to the scene) placed in the depth buffer. Accordingly, a specific buffer type among the plurality of bound buffers may be filled with different information of the frame.

In some instances, a third-party application or process (also referred to as a secondary application) other than the main application may attempt to access and/or identify a buffer used by the main application for a specific purpose (for a post-processing operation such as color and contrast enhancements, color adjustments for color-blind users, and other modifications to objects and/or colors within a video or game output being displayed). Correctly identifying a specific buffer among the plurality of bound buffers for a third-party application is non-trivial. One way to accomplish this, for example, with a depth buffer is by examining the properties of each draw call with the accompanying depth data and determining whether the size of the current buffer receiving the depth data aligns with the final image size. However, this approach can cause the depth buffer to be incorrectly identified, especially when there are multiple draw calls accompanied with depth data. In particular, if multiple draw calls accompanied with depth data are sent to more than one of the plurality of bound buffers, each having a buffer size aligning with the final image size, the first buffer of the plurality bound buffers with accompanying depth data can be erroneously identified as the depth buffer, while another buffer of the plurality of buffers may, in fact, be the depth buffer. If the main application sends draw calls with accompanying depth data to a buffer that is smaller than the final image size (e.g., due to Dynamic Resolution Scaling (DRS)) or to a portion of the previously used buffer (e.g., viewport that defines a region of the bound buffer in which the draw calls are received), the first buffer of the plurality of bound buffers, having a buffer size smaller than the final image size, with accompanying depth data can erroneously be identified as the depth buffer. Dynamic Resolution Scaling (DRS) may be used to render to a smaller portion of the buffer with a predetermined allocated buffer size, which may be different than the display size. For example, the allocated buffer size may be smaller than the display size to save on performance at the cost of image quality. Dynamic Super Resolution (DSR) may be used to start with an allocated buffer size that is larger than the display size and down sample to the resolution size to provide better image quality (e.g., anti-aliasing). Both techniques can cause the allocated buffer size to either upscale (up sample) or downscale (down sample) to the display size at the end of the frame. Accordingly, another buffer of the plurality of bound buffers, having a buffer size smaller than the final image size and with corresponding depth data, may, in fact be the depth buffer.

In some instances, the third-party application may identify a specific buffer among the plurality of bound buffers used for video display instead of the predesignated buffer. However, due to often misidentifying the specific buffer by the third-party application, the misidentified specific buffer which contains incorrect data (e.g., garbage data) may be used for video display, thereby causing the main application to experience flickering between frames.

Further, the frame of the main application may be displayed with a heads-up-display (HUD) (e.g., overlay) or hudless (e.g., without a heads-up-display). In one example, in order to have the option to display the frame of the main application in either HUD or hudless, the main application can send draw calls to a hudless buffer and then copy the hudless buffer to a colour buffer and send additional draw calls to draw the HUD portion of the frame. Thus, the choice of displaying the frame of the main application with HUD or hudless is based on selecting the appropriate buffer. In another example, in order to have the option to display the frame of the main application in either HUD or hudless, the main application can send draw calls to the colour buffer and then send additional draw calls to the same colour buffer without other API calls in-between (e.g., no binds to other buffers, no discarding of buffers, etc.) to draw the HUD portion of the frame. Thus, the choice of displaying the frame of the main application with HUD or hudless is based on selecting the colour buffer at the appropriate time. Accordingly, typically the third-party application would identify the hudless buffer by examining the properties of each draw call for accompanying colour data and the absence of accompanying HUD data, which could often result in misidentifying the hudless buffer. Thus, many applications attempting to utilize the hudless display may not work correctly.

Aspects of the present disclosure address the above and other deficiencies by providing techniques and methods of initializing, during the rendering of the first frame of the main application or prior to a secondary (third-party application) performing post-processing, a data structure for each buffer that is bound to the main application. The data structure for each buffer may be used to collect multiple statistics, each updated based on draw calls received by the respective buffer. A score can be determined for each buffer based on the statistic collected via a corresponding data structure and a weight associated with the statistic. The score indicates the likelihood of the buffer being associated with a specific buffer type among all the buffers, Accordingly, based on the score of each buffer used by the main application, a buffer of a particular buffer type is identified and/or selected (e.g., copied) for a corresponding post-processing operation for each subsequent frame by the secondary application. In some embodiments, based on additional configurations associated with the main application, the buffer identified for post-processing may be selected after or before a specific draw call directed to the buffer is issued. Depending on the embodiment, if the buffer identified for post-processing is no longer bound (e.g., is destroyed and/or discarded), the data structures for the buffers of the main application may be cleared or additional data structures may be initialized for the buffers of the main application and used to identify and/or select a new buffer for post-processing.

Accordingly, aspects of the present disclosure provide increased accuracy in selecting a specific buffer of the main application for post-processing, thereby reducing buffer flicker across frames of the main application. In addition, aspects of the present disclosure improve accuracy in selecting the specific buffer to present its content at the appropriate time and reduce a possibility of presenting incorrect content of the buffer.

FIG. 1 illustrates a computer system 100 that includes a CPU 110, a GPU 150, and a video display 180 in accordance with some embodiments of the present disclosure. The CPU 110 can communicate with the GPU 150 via a device driver (e.g., driver), which provides an interface between the CPU 110 and the GPU 150 hardware functions without knowledge of the precise details about the hardware being used.

The CPU 110 can include an application 120 (also referred to herein as a main application), a buffer identification component 115, and application 130 (also referred to herein as a secondary application). The GPU 150 includes a graphics pipeline 160. The graphics pipeline 160 refers to a series of steps the GPU 150 performs to render a 3D scene of the application 120 to a 2D screen (e.g., video display 180).

Application 120 may generate 3D scenes to be displayed on video display 180. The application 120 may send an API call (e.g., a bind call) to the GPU to generate a plurality of buffers to render the 3D scene of the application 120 to video display 180. Each bind call may be accompanied by information relevant to generating a buffer, for example, the format of the data to be received by the GPU, size of the buffer, etc. Each buffer of the plurality of buffers is generated (e.g., bound or enabled) with each bind call sent by the application 120 to the GPU 150. Each bind call received by the GPU 150 causes the GPU 150 to allocate a portion of random-access memory (RAM) of the GPU 150 and designate the allocated portion as a buffer accessible (e.g., via a buffer pointer to the portion of the RAM of the GPU 150) to the CPU 110 and the GPU 150 to receive data to be processed by the GPU or rendered by a video display.

The application 120 uses the plurality of buffers of the graphics pipeline 160 for each frame of the application to compile (e.g., compose) a final image (e.g., the frame of the application 120) for display (e.g., presentation) on the video display 180. In particular, the application 120 can send an API call (e.g., draw call) to the graphics pipeline 160 to draw each primitive associated with the 3D scene of the application 120 using one or more buffers of the plurality of buffers. The application 120 may send a plurality of draw calls (e.g., 1000 draw calls) to the graphics pipeline 160 for each frame of the application 120. The application 130 (e.g., a third-party application or process) may need to identify and access the buffer created/used by the application 120 to perform one or more post-processing operations (e.g., color and contrast enhancements, color adjustments for color-blind users, and/or other modifications to objects and/or colors within a video or game output being displayed).

The buffer identification component 115 can assist the application 130 with the identification of the buffers created/used by the application 130. In particular, in some embodiments, on startup of the application 120 (e.g., during the processing of the first frame of the application 120) or in some instances, once the buffer identification component 115 is enabled (e.g., during the processing of the first frame of the application 120 after the buffer identification component 115 is enabled), the buffer identification component 115 may intercept (e.g., examine) bind calls to identify, based on a buffer pointer to which a bind call is directed, a buffer of the plurality of buffers allocated to the application 120. The buffer identification component 115, for each buffer of the plurality of buffers identified, can initialize a buffer statistic data structure (e.g., a data structure) identified by the buffer pointer of the respective buffer. The data structure associated with each buffer of the plurality of buffers can be used to perform statistical analysis by tracking information regarding each draw call of the plurality of draw calls directed to the corresponding buffer. Based on various draw calls directed to the plurality of buffers, each corresponding data structure may be used to collect a plurality of statistics, such as a draw call count, a viewport draw call count, and a matching draw data count.

In some embodiments, the application 120 may reuse one or more buffers of the plurality of buffers bound to the application 120. In other words, the application 120 may send an API call (e.g., clear call) to the graphics pipeline 160 to clear existing data from a buffer of the plurality of buffers. With each clearing of the buffer of the plurality of buffers, a new instance of the buffer can be created. Accordingly, the buffer identification component 115 may initialize a data structure identified by the buffer pointer of the respective buffer and an instance of the respective buffer. For example, before a first clear call, the data structure, associated with a buffer identified as buffer "A," may be identified as data structure "A" or data structure "A1" and after the first clear call, the data structure associated with a second instance of buffer "A," may be identified as data structure "A2."

Once the plurality of buffers is bound (e.g., allocated) to the application 120, the application 120 can begin sending one or more draw calls of the plurality of draw calls to the graphics pipeline 160. A draw call is one or more commands issued by the application 120 to the GPU 150 (e.g., graphics pipeline 160) to dictate what and how to render (e.g., draw) an object of the 3D scene. The application 120 may, based on the buffer pointer, send a draw call to a corresponding buffer of the plurality of buffers with draw data (e.g., information to assist in rendering the object of the 3D scene). The draw data accompanying the draw call fills the buffer corresponding to the buffer pointer. The draw data may be depth data, colour data, or any other suitable object information in a specified format that can be received by a buffer of the plurality of buffers.

With each draw call sent to the graphics pipeline 160, the buffer identification component 115 may intercept (e.g., examine) the draw call with the accompanying draw data. Based on the buffer pointer associated with the draw call, the buffer identification component 115 may identify, based on the buffer pointer of the draw call, the buffer to which the draw call is directed and access the data structure corresponding to the buffer. In some embodiments, based on the clear call received by the buffer identified by the buffer pointer of the draw call, the buffer identification component 115 may access a data structure corresponding to a specific instance of the buffer identified by the buffer pointer of the draw call. The buffer identification component 115 may update the data structure corresponding to the buffer identified by the buffer pointer of the draw call based on the draw data. The data structure may include elements or fields each associated with a particular statistic (e.g., a draw call count, a viewport draw call count, a matching draw data count, etc.). In one example, the buffer identification component 115 may update the draw call count of the data structure by incrementing the draw call count of the data structure by 1 based on receiving the draw call (e.g., or the number of draw calls received). In another example, the buffer identification component 115 may update the viewport draw call count of the data structure by incrementing the viewport draw call count by 1 based on a draw call received by the identified buffer and directed to a viewport of the identified buffer. The viewport of the identified buffer may be used for the live view from the camera or images in playback. The viewport of the identified buffer may be different than the identified buffer because the buffer may not be the same size as the actual display area (e.g., the viewport of the identified buffer). In yet another example, the buffer identification component 115 may update the matching draw data count of the data structure by incrementing the matching draw data count by 1 based on identifying that the format of the draw data accompanying the draw call matches a specific data format.

The buffer identification component 115 can continue to intercept the draw calls of the plurality of draw calls until the application 120 renders the 3D scene to the video display 180 via the plurality of draw calls. In some embodiments, the buffer identification component 115 may apply a predetermined set of weight coefficients (e.g., weights) to each data structure associated with each buffer of the plurality of buffers. Additionally, the buffer identification component 115 may apply the predetermined set of weights to each data structure associated with each instance of each buffer of the plurality of buffers. The set of weights may include distinct values each associated with a particular type of statistic collected using a designated field or element of the data structure. The set of weights can be determined based on historical data of application 120 that indicates the importance of each statistic type in identifying a specific buffer type. Accordingly, the predetermined set of weights refers to a set of weights to be applied to the statistics of a data structure to determine the likelihood (e.g., confidence) that the buffer corresponding to the data structure is a specific type of buffer (e.g., a depth buffer or a colour buffer).

Thus, each specific buffer of the plurality of buffers can have a separate predetermined set of weights. For example, a predetermined set of weights may be configured specifically to identify the depth buffer and another predetermined set of weights to specifically identify the colour buffer. The buffer identification component 115 may determine a score for each data structure based on each weight of the predetermined set of weights multiplied by each statistic of the respective data structures. The predetermined set of weights may include a weight to be applied to the draw call count (e.g., a draw call count weight), a weight to be applied to a viewport draw call count (e.g., a viewport draw call count weight), and a weight to be applied to a matching draw data count (e.g., a matching draw data count weight). Depending on the embodiment, a weight may be configured for various metadata or characteristics of the draw calls and corresponding draw data to identify a specific type of buffer.

A score indicating the likelihood that the buffer associated with the data structure is the specific type of buffer (e.g., a depth buffer or a colour buffer) can be calculated by applying the predetermined set of weights to respective statistics collected via the data structure associated with the buffer, and calculating a sum of the resulting values. For example, the buffer identification component 115 can apply the draw call count weight of the predetermined set of weights to the draw count weight of the data structure, the viewport draw call count weight of the predetermined set of weights to the viewport draw call count of the data structure, and the matching draw data count weight of the predetermined set of weights to the matching draw data count of the data structure, and computing a sum of the resulting values.

Once a score is obtained for each data structure, the buffer identification component 115 can compare each score associated with each data structure of the plurality of data structures to determine which data structure has the largest score among the scores of the plurality of data structures. Then, for each subsequent frame after the first frame of the application 120, the buffer identification component 115 can select (e.g., copy) the buffer, which corresponds to the data structure with the largest score, and provide an identification of this buffer to the application 130 to perform one or more post-processing operations. In some embodiments, the buffer corresponding to the data structure having the largest score among the scores of the plurality of data structures may be a buffer of the plurality of buffers or an instance of a buffer of the plurality of buffers.

In some embodiments, the application 130 may need to perform post-processing on a frame without a heads-up display (HUD) (e.g., Hudless frame). As described previously, the HUD is typically applied to a colour buffer of the plurality of buffers after a specific draw call of the plurality of draw calls received by the colour buffer. Accordingly, in order to assist the application 130 with obtaining a hudless frame, the buffer identification component 115 may identify the colour buffer among the plurality of buffers and identify a specific point among the plurality of buffer calls received by the colour buffer to select the colour buffer. For example, the buffer identification component 115 may, as described previously, identify a data structure among the plurality of data structures that have the largest score that matches a specific type of buffer (e.g., a colour buffer). The buffer identification component 115 may use a predetermined start HUD value to identify a number of draw calls that the buffer receives prior to receiving draw calls from the application 120 to draw the HUD—for example, the predetermined start HUD value may be 2, indicating that draw calls to draw HUD will begin after receiving 2 draw calls at the buffer. In some embodiments, the predetermined start HUD value may be configured differently for each application, and therefore the predetermined start HUD value may be specific to the application 120. In some embodiments, the predetermined start HUD value may be determined by intercepting draw calls by the buffer identification component 115 to determine at which point the draw call is accompanied by draw data associated with HUD.

The buffer identification component 115 may determine that the buffer corresponding to the data structure with the largest score and identified as matching a specific type of buffer (e.g., a colour buffer) has received one or more draw calls equal to the predetermined start HUD value, and select (e.g., copy) the buffer prior to receiving the next draw call by providing an identification of this buffer to the application 130. The application 130 can then use this buffer, for each subsequent frame, to perform post-processing of the respective frame without HUD.

Depending on the embodiment, the buffer identified for post-processing may no longer be bound to the application 120. For example, a frame processed by the application 120 using this buffer may have been previously discarded and/or destroyed via an API call (e.g., destroy/discard call) sent from the application 120 to the graphics pipeline 160 directed to the buffer, and in some instances, one or more of the plurality of buffers. During the processing of the next frame of the application 120 (e.g., subsequent frame), after determining that the buffer is no longer bound to the application 120, the buffer identification component 115 may clear all data structures associated with the remaining buffers of the plurality of buffers. Then, the buffer identification component 115 may discard or destroy data structures associated with buffers of the plurality of buffers that have been discarded or destroyed. Finally, the buffer identification component 115 may initialize one or more data structures for each buffer bound to the application 120, as described previously. In some embodiments, the buffer identification component 115 may discard and/or destroy all data structures associated with the plurality of buffers and initialize for each buffer of the plurality of buffers bound to the application 120 a new data structure. Accordingly, the buffer identification component 115 may use the data structure as noted above to identify the buffer with the largest score indicating that the buffer is a specific type of buffer. Once the buffer with the largest score is identified, the buffer identification component 115 may provide the identifier of this buffer to the application 130, which can select (e.g., copy) this buffer for post-processing of each subsequent frame. Alternatively, the buffer identification component 115 can continue to select the newly identified buffer for each subsequent frame and provide its identifier to the application 130 for post-processing of the respective frame.

Depending on the embodiment, every predetermined number of frames (e.g., every 1000 frames) of the application 120, the buffer identification component 115 may initialize, for each buffer of the plurality of buffers bound to the application 120, a new data structure. Accordingly, the buffer identification component 115 may use the new data structure as noted above to identify the buffer with the largest score indicating that the buffer is a specific type of buffer. Then the buffer identification component 115 may determine whether the buffer with the largest score corresponding to the previous data structure and the buffer with the largest score corresponding to the new data structure is identical.

If the buffer with the largest score corresponding to the previous data structure is the same as the buffer with the largest score corresponding to the new data structure, the buffer identification component 115 can continue to select the buffer with the largest score corresponding to the previous data structure for post-processing of each subsequent frame by the application 130. Otherwise, the buffer identification component 115 can select the buffer with the largest score corresponding to the new data structure for post-processing of each subsequent frame by the application 130.

In some embodiments, the buffer identification component 115 may discard and/or destroy all data structures associated with the plurality of buffers and initialize for each buffer of the plurality of buffers bound to the application 120 a new data structure. Accordingly, the buffer identification component 115 may use the data structures as noted above to identify the buffer with the largest score indicating that the buffer is a specific type of buffer. Once the buffer with the largest score is identified, the buffer identification component 115 may continue to select (e.g., copy) the newly identified buffer for post-processing of each subsequent frame by the application 130.

Depending on the embodiment, when selecting a buffer with the largest score regardless of or prior to or after a specific number of draw calls received by the buffer, the buffer identification component 115 may time the buffer copy based on when the application 120 causes the graphics pipeline 160 to do the copy rather than when the application 120 submits the command. In particular, in some embodiments, the application 120 may submit multiple API calls and commands simultaneously, and therefore identifying when to perform the command may not be based on the submission of the command but rather on the execution of the command.

In some embodiments, a neural network or a machine learning model of another type is trained to recognize a specific buffer type (e.g., depth, color, HDR). In other words, for each buffer type, there may be a corresponding machine learning model (e.g., a neural network) that produces the estimated probability of a given buffer belonging to the buffer type corresponding to the neural network. The input of such a neural network may be statistics of a data structure (e.g., Intercepted API Calls Information Data Structure (IAPICIDS)) that reflect parameter values (e.g., contains raw parameter values, aggregated parameter values, transformed parameter values, or any combination thereof) of intercepted graphic API calls (draw calls) directed to a buffer whose type needs to be determined. In particular, While at least one frame is rendered by the application, the buffer identification component 115 can intercept graphic API calls (e.g., draw calls) with respect to a specified buffer and record the parameter values into the data structure (the IAPICIDS) according to its format (e.g., parameter values, aggregated parameter values, transformed parameter values, or any combination thereof). The resulting statistics (IAPICIDS parameters values) can then be fed to the trained machine learning models (e.g., trained neural networks) corresponding to the buffer types. Based on the values (scores) produced by the trained machine learning models (e.g., trained neural networks), the maximum value or score can be selected by the buffer identification component 115, and the buffer type corresponding to the machine learning model that has produced the maximum value or score can be determined to be the inferred buffer type for the specified buffer by the buffer identification component 115.

In some embodiments, the machine learning models (e.g., neural networks) are trained by performing supervised training. For example, a neural network can be initialized with default neuron weights (e.g., corresponding to the middle of a predefined range). At every training iteration, the neural network can be fed the IAPICIDS for a specified buffer, and the value produced by the neural network can be compared to the ground truth, which can be defined, e.g., by performing a pixel-by-pixel analysis of the specified buffer (or by any other suitable method of determining the buffer type). The error can then be back-propagated, and the neuron weights can be updated accordingly. The training iterations may continue until a predefined terminating condition is satisfied (e.g., predefined number of training iterations is reached, or the number of errors falls below a predefined threshold, or the weight adjustment falls below a predefined threshold, etc.).

Figure 2:
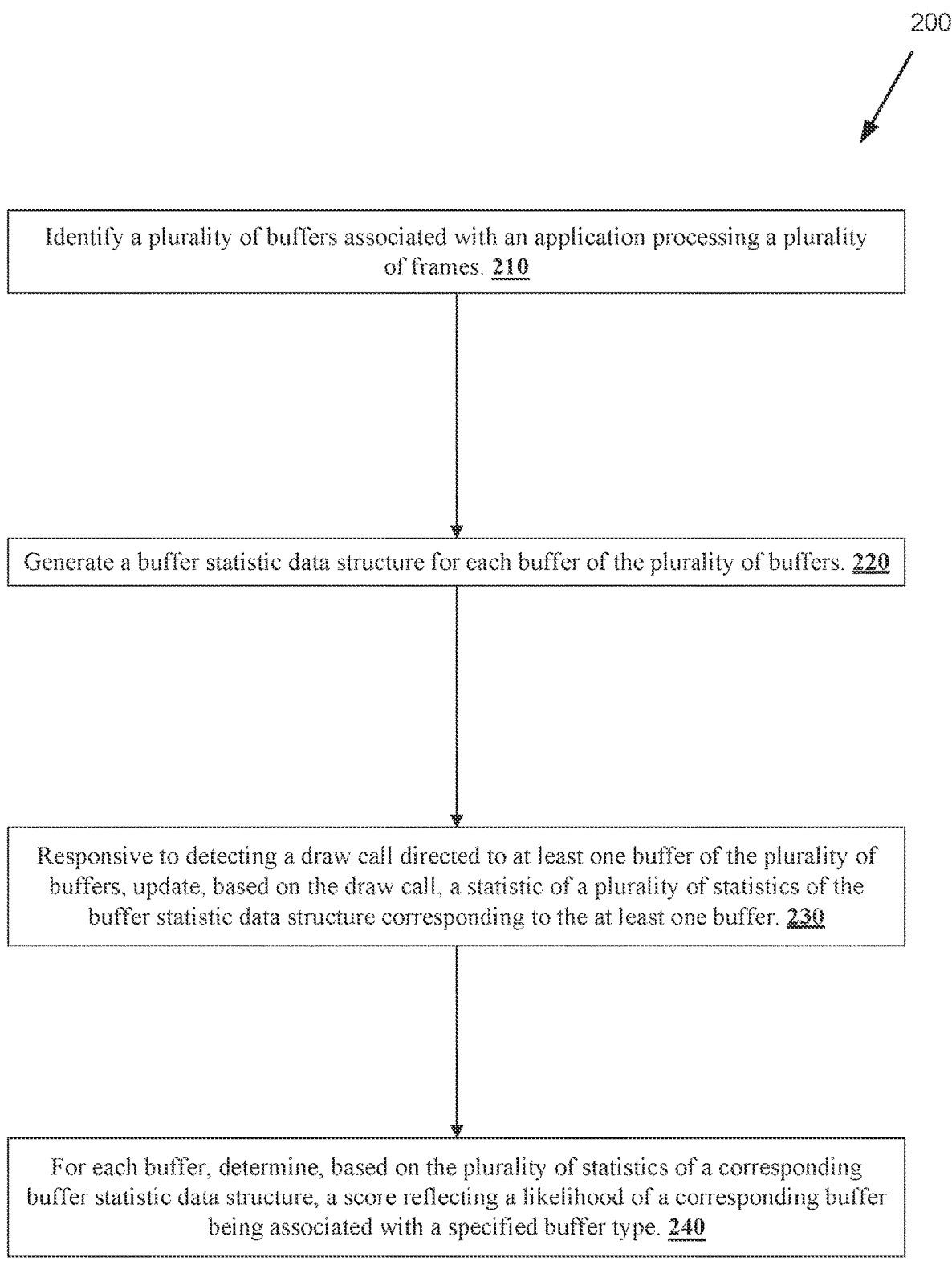
FIG. 2 is a flow diagram of a method to identify, via statistical analysis, a buffer of an application for post-processing operations, according to at least one embodiment.
Figure 3:
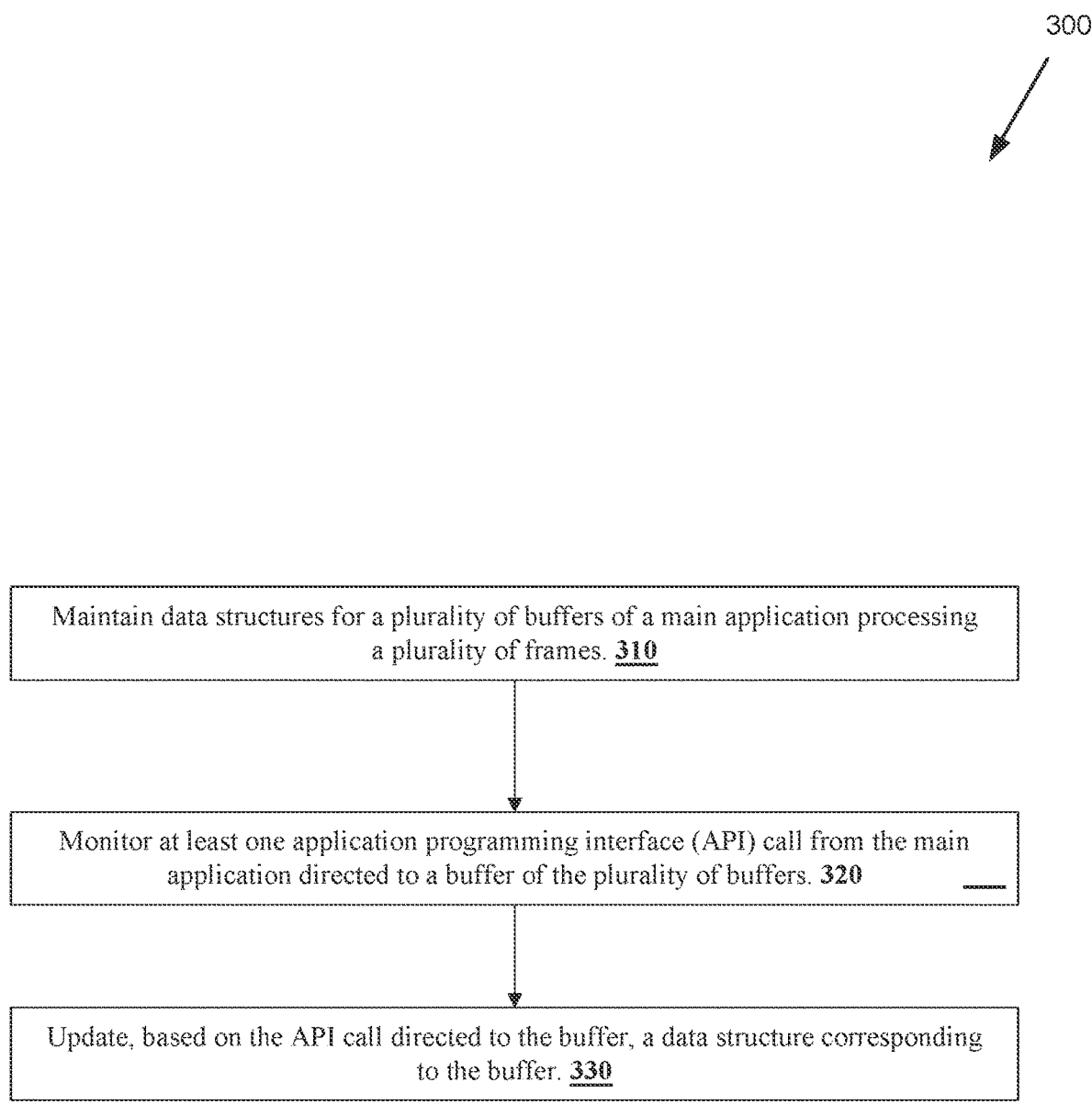
FIG. 3 is a flow diagram of a method to identify, via statistical analysis, a buffer of an application for post-processing operations, according to at least one embodiment.

FIG. 2 is a flow diagram of an example method 300 of identifying a buffer of an application for post-processing operations, in accordance with at least one embodiment. FIG. 3 is a flow diagram of another example method 300 of identifying a buffer of an application for post-processing operations, in accordance with at least one embodiment.

Methods 200 and 300 can be performed by processing logic that can include hardware (e.g., processing device, circuitry, dedicated logic, programmable logic, microcode, hardware of a device, integrated circuit, etc.), firmware, software (e.g., instructions run or executed on a processing device), or a combination thereof. In some embodiments, method 200 or 300 is performed by the buffer identification component 115 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operations flows are possible. In some embodiments, different operations can be used. In some embodiments, the same, different, fewer, or more operations can be used.

Referring to FIG. 2, at block 210, the processing logic identifies a plurality of buffers associated with an application (also referred to herein as a main application) that implements operations for processing a plurality of frames. As discussed above, the plurality of buffers may be bound to the application to receive draw calls used to draw objects of a frame. The plurality of buffers may include one or more colour buffers and one or more depth buffers. For example, a depth buffer or z-buffer may be used to represent data associated with the depth of objects in the frame. Based on the buffer, a draw call with corresponding data, such as colour data, depth data, etc., can be created by the GPU to draw objects of the frame on a video display. According to a state of a graphics pipeline of the GPU, the application can indicate what type of data a buffer is designated to receive, and the GPU can create corresponding data (e.g., depth data, colour data, etc.) to accompany the draw call. Accordingly, if the buffer is designated to receive depth data, depth data can be generated to accompany the draw call, or if the buffer is designated to receive colour data, colour data can be generated to accompany the draw call. In some embodiments, the application is a main application, and the buffer statistic data structure is generated for a secondary application.

At block 220, the processing logic can generate a buffer statistic data structure for a buffer of the plurality of buffers that is used to process a frame of the application. As described previously, the application may send an API call (e.g., a bind call) to the GPU to allocate the plurality of buffers to render the 3D scene of the application and accompanied by information relevant to generating a buffer. Additionally, for each buffer of the plurality of buffers identified, the processing logic can initialize a buffer statistic data structure (e.g., a data structure) having a plurality of fields or elements each storing one of a plurality of statistics (e.g., a draw call count, a viewport draw call count, and a matching draw data count). The buffer statistic data structure can be identified by the buffer pointer of the respective buffer to assist in tracking information regarding each draw call of the plurality of draw calls directed to the corresponding buffer.

At block 230, responsive to detecting a draw call directed to at least one buffer of the plurality of buffers, the processing logic updates, based on the draw call, a statistic of a plurality of statistics of the buffer statistic data structure corresponding to the at least one buffer. As described previously, once the plurality of buffers is bound, they can begin receiving one or more draw calls of the plurality of draw calls. Each draw call accompanied with draw data (e.g., metadata of the draw call) may be directed to a buffer identified by the buffer pointer, and based on the buffer pointer of the draw call, the data structure corresponding to the buffer identified by the buffer pointer of the draw call can be updated. Updating the data structure may include updating the corresponding statistics stored in the fields or elements of the data structure, such as incrementing the draw call count, incrementing the viewport draw call count, and/or incrementing the matching draw data count in the corresponding fields or elements of the data structure.

At block 240, for each buffer, the processing logic determines, based on the updated statistics of a corresponding buffer statistic data structure, a score reflecting a likelihood of a corresponding buffer being associated with a specified buffer type. To determine the score, the processing logic can apply a weight coefficient of a set of weight coefficients to each statistic of the plurality of statistics of the respective buffer statistic data structure. The predetermined set of weights (e.g., weight coefficient) can refer to a set of weights to be applied to the statistics of a data structure to determine the likelihood (e.g., confidence) that the buffer corresponding to the data structure is a specific buffer type (e.g., a depth buffer or a colour buffer). In particular, each weight coefficient can reflect a degree of relevance of a respective statistic to identifying a specific type of buffer among the plurality of buffers (e.g., a depth buffer or a colour buffer). Upon applying the weight coefficients to each statistic of the plurality of statistics, the processing logic can obtain a sum of the plurality of statistics. The sum of the plurality of statistics with the applied weight coefficients can indicate a score of the buffer. In some embodiments, the processing logic selects, among the plurality of buffers, a buffer with a largest score reflecting a likelihood of the buffer being associated with the specified buffer type. As described previously, once a score is obtained for each data structure, the processing logic can compare each score associated with each data structure of the plurality of data structures to determine which data structure has the largest score among the scores of the plurality of data structures.

Depending on the embodiment, to determine the score, the processing logic can provide statistic of a buffer statistic data structure corresponding to a buffer as input to one or more trained machine learning models that are each associated with a buffer type of one or more buffer types. The processing logic can obtain an output of the one or more trained machine learning models. Each output of the one or more trained machine learning models can provide a score reflecting the likelihood of the buffer being associated with the buffer type of the plurality of buffer types. The one or more trained machine learning models can be trained using training data that comprises, for each buffer of the plurality of buffers, one or more metadata of the draw calls directed to a respective buffer and a pixel-by-pixel analysis of the respective buffer. As previously described, supervised training can be performed to train the one or more trained machine learning models by iteratively training the neural network using the training data for a specified buffer, and the value produced by the neural network can be compared to the ground truth, which can be defined, e.g., by performing a pixel-by-pixel analysis of the specified buffer (or by any other suitable method of determining the buffer type).

In some embodiments, the processing logic selects the buffer identified as having the largest score among the scores of the plurality of buffers. As described previously, the buffer corresponding to the data structure having the largest score among the scores of the plurality of data structures is selected (e.g., copied) for each subsequent frame after the first frame of the application for post-processing.

In some embodiments, the processing logic intercepts a command of the application to reuse the buffer. Responsive to intercepting the command of the application to reuse the buffer, the processing logic generates a second buffer statistic data structure and associates the second buffer statistic data structure with a second instance of the buffer. For each draw call directed to the second instance of the buffer, the processing logic updates a statistic of a plurality of statistics of the second buffer statistic data structure. The processing logic determines, for each second buffer statistic data structure, a score reflecting a likelihood of a second instance of a buffer corresponding to a respective second buffer statistic data structure being associated with a specified buffer type. As described previously, after the plurality of buffers is bound, the application may reuse one or more buffers of the plurality of buffers by sending an API call (e.g., clear call) to clear existing data from a buffer of the plurality of buffers. With each clear of the buffer of the plurality of buffers, a new instance of the buffer is created.

The processing logic compares scores of the plurality of buffers comprising existing instances of the plurality of buffers. The scores of the plurality of buffers may include the score of the buffer and the score of the second instance of the buffer; and identifying, based on the comparison, an instance of a buffer with the largest score. The processing logic selects the buffer identified as having the largest score among the scores of the plurality of buffers. As described previously, the buffer corresponding to the data structure having the largest score among the scores of the plurality of data structures is selected (e.g., copied) for each subsequent frame after the first frame of the application for post-processing.

In some embodiments, responsive to the removal of the buffer identified as having the largest score, the processing logic generates, for each buffer of a plurality of buffers of a subsequent frame, a third buffer statistic data structure and associates the third buffer statistic data structure with the plurality of buffers remaining after the removal of the buffer identified as having the largest score. For each draw call directed to the plurality of buffers remaining after the removal, the processing logic updates, based on the draw call, a statistic of a plurality of statistics of the third buffer statistic data structure. The processing logic determines, for each third buffer statistic data structure, a score reflecting a likelihood of a buffer of the plurality of buffers remaining after the removal corresponding to a respective third buffer statistic data structure being associated with a specified buffer type. As previously described, the buffer identified as having the largest score may no longer be bound in response to an API call to unbound and/or destroy the buffer. Accordingly, one or more data structures may be initialized for each buffer still bound to the application, which is updated based on draw calls directed to the one or more buffers still bound to the application and used to identify the buffer of the one or more buffers still bound to the application with the largest score indicating that the buffer is a specific type of buffer.

Referring to FIG. 3, at block 310, the processing logic (e.g., of the buffer identification component 115) maintains data structures for a plurality of buffers of a main application processing a plurality of frames. As described previously, every visible portion of a frame in the application is sent to a GPU to be drawn (e.g., via draw calls). The main application may send an API call (e.g., a bind call) to the GPU to allocate the plurality of buffers to render the 3D scene of the application and accompanied by information relevant to the creation of each buffer. As discussed above, the processing logic can create and maintain a data structure for each of the buffers.

At block 320, the processing logic (e.g., of the buffer identification component 115) monitors at least one application programming interface (API) call from the main application directed to a buffer of the plurality of buffers.

At block 330, the processing logic (e.g., of the buffer identification component 115) updates, based on the API call directed to the buffer, a data structure corresponding to the buffer. As described previously, the data structure can store a plurality of statistics (e.g., a draw call count, a viewport draw call count, and a matching draw data count) to assist in tracking information regarding each draw call of the plurality of draw calls directed to the corresponding buffer. Once the plurality of buffers is bound and begin receiving one or more draw calls of the plurality of draw calls, each draw call accompanied with draw data (e.g., metadata of the draw call) may be directed to a buffer identified by the buffer pointer. Based on the buffer pointer of the draw call, the data structure corresponding to the buffer identified by the buffer pointer of the draw call is updated. To update, based on the API call directed to the buffer, the processing logic updates the plurality of statistics of the data structure by incrementing the draw call count of the data structure, incrementing the viewport draw call count, and/or incrementing the matching draw data count.

In some embodiments, for each data structure associated with a buffer of the plurality of buffers, the processing logic applies a weight coefficient of a set of weight coefficients to each statistic of the plurality of statistics of the respective buffer statistic data structure. The predetermined set of weights (e.g., weight coefficient) refers to a set of weights to be applied to the statistics of a data structure to determine the likelihood (e.g., confidence) that the buffer corresponding to the data structure is a specific buffer type (e.g., a depth buffer or a colour buffer). In particular, each weight coefficient reflects a degree of relevance of a respective statistic to identifying a specific type of buffer among the plurality of buffers (e.g., a depth buffer or a colour buffer). Upon applying the weight coefficients to each statistic of the plurality of statistics, the processing logic obtains a sum of the plurality of statistics (e.g., a score). The sum of the plurality of statistics with the applied weight coefficients indicates a score of the buffer. In some embodiments, the processing logic selects, among the plurality of buffers, a buffer with a largest score reflecting a likelihood of the buffer being associated with the specified buffer type. As described previously, once a score is obtained for each data structure, the processing logic compares each score associated with each data structure of the plurality of data structures to determine which data structure has the largest score among the scores of the plurality of data structures. The buffer corresponding to the data structure having the largest score among the scores of the plurality of data structures is selected and the secondary application is notified about this buffer so that the secondary application can use it (e.g., copy) for post-processing of each subsequent frame (after the first frame of the application).

In some embodiments, responsive to the removal of the buffer identified as having the largest score, the processing logic generates, for each buffer of a plurality of buffers for processing a subsequent frame, a third buffer statistic data structure. For each draw call received by the respective buffer, the processing logic can update the third buffer statistic data structure with metadata of each draw call received by the respective buffer to determine a score of the respective buffer.

In some embodiments, responsive to receiving a command indicating a request to reuse the buffer, the processing logic generates a second buffer statistic data structure and associates the second buffer statistic data structure with a second instance of the buffer. For each draw call received by the second instance of the buffer, the processing logic updates the second buffer statistic data structure with metadata of each draw call received by the second instance of the buffer to determine a score of the second instance of the buffer. As described previously, after the plurality of buffers is bound, the application may reuse one or more buffers of the plurality of buffers by sending an API call (e.g., clear call) to clear existing data from a buffer of the plurality of buffers. With each clear of the buffer of the plurality of buffers, a new instance of the buffer is created.

The processing logic compares scores of the plurality of buffers comprising existing instances of the plurality of buffers. The scores of the plurality of buffers may include the score of the buffer and the score of the second instance of the buffer; and identifying, based on the comparison, an instance of a buffer with a largest score. The processing logic selects the buffer identified as having the largest score among the scores of the plurality of buffers. As described previously, the buffer corresponding to the data structure having the largest score among the scores of the plurality of data structures is selected for post-processing of each subsequent frame (after the first frame of the application).

In some embodiments, the processing logic intercepts a command of the application to reuse the buffer. Responsive to intercepting the command of the application to reuse the buffer, the processing logic generates a second buffer statistic data structure and associates the second buffer statistic data structure with a second instance of the buffer. For each draw call directed to the second instance of the buffer, the processing logic updates a statistic of a plurality of statistics of the second buffer statistic data structure. The processing logic determines, for each second buffer statistic data structure, a score reflecting a likelihood of a second instance of a buffer corresponding to a respective second buffer statistic data structure being associated with a specified buffer type. As described previously, after the plurality of buffers is bound, the application may reuse one or more buffers of the plurality of buffers by sending an API call (e.g., clear call) to clear existing data from a buffer of the plurality of buffers. With each clear of the buffer of the plurality of buffers, a new instance of the buffer is created.

The processing logic compares scores of the plurality of buffers comprising existing instances of the plurality of buffers. The scores of the plurality of buffers may include the score of the buffer and the score of the second instance of the buffer; and identifying, based on the comparison, an instance of a buffer with the largest score. The processing logic selects the buffer identified as having the largest score among the scores of the plurality of buffers. As described previously, the buffer corresponding to the data structure having the largest score among the scores of the plurality of data structures is selected (e.g., copied) for each subsequent frame after the first frame of the application for post-processing.

In some embodiments, responsive to the removal of the buffer identified as having the largest score, the processing logic generates, for each buffer of a plurality of buffers of a subsequent frame, a third buffer statistic data structure and associates the third buffer statistic data structure with the plurality of buffers remaining after the removal of the buffer identified as having the largest score. For each draw call directed to the plurality of buffers remaining after the removal, the processing logic updates, based on the draw call, a statistic of a plurality of statistics of the third buffer statistic data structure. The processing logic determines, for each third buffer statistic data structure, a score reflecting a likelihood of a buffer of the plurality of buffers remaining after the removal corresponding to a respective third buffer statistic data structure being associated with a specified buffer type. As previously described, the buffer identified as having the largest score may no longer be bound in response to an API call to unbound and/or destroy the buffer. Accordingly, one or more data structures may be initialized for each buffer still bound to the application, which is updated based on draw calls directed to the one or more buffers still bound to the application and used to identify the buffer of the one or more buffers still bound to the application with the largest score indicating that the buffer is a specific type of buffer.

Figure 4:
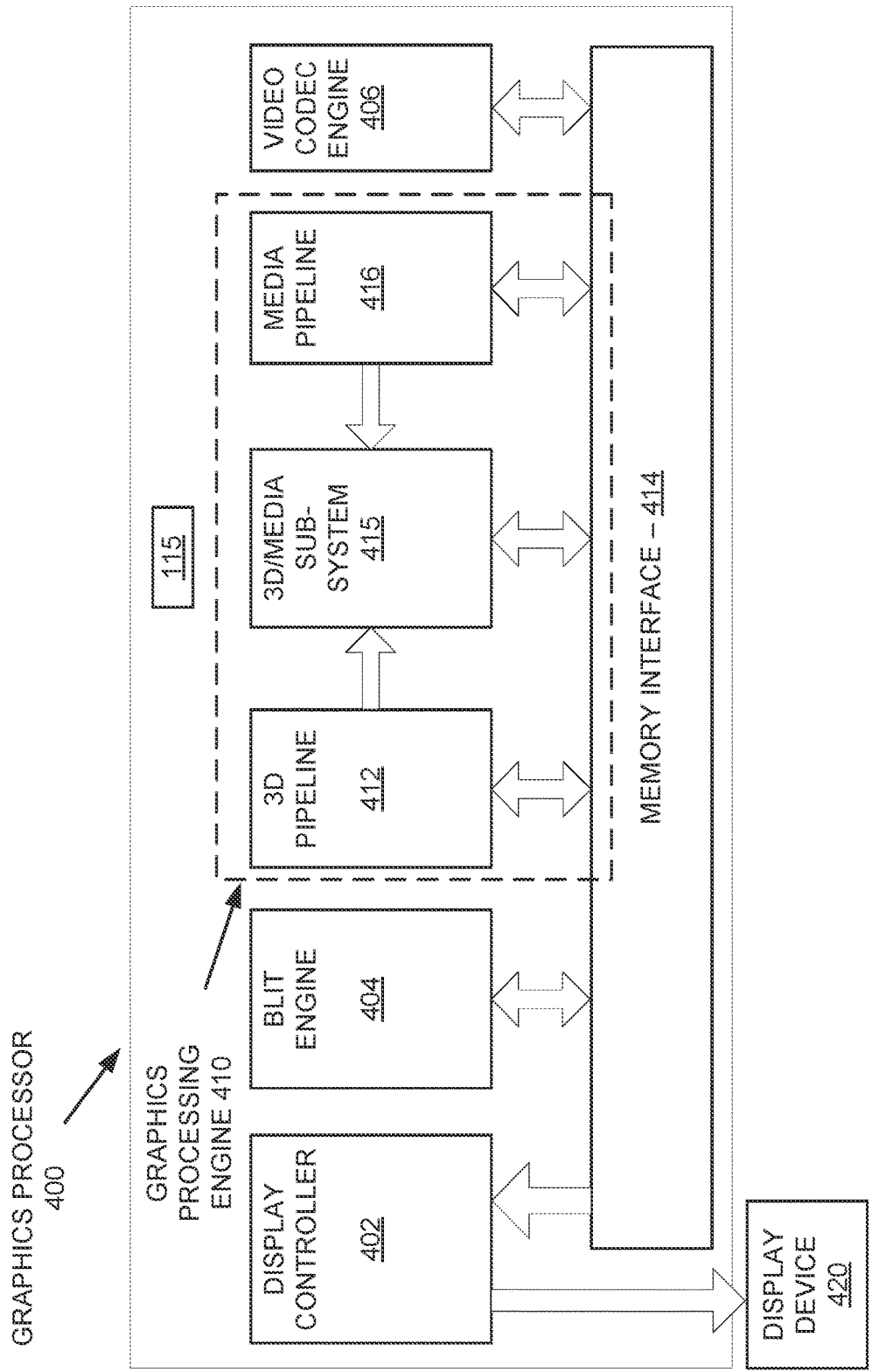
FIG. 4 illustrates at least a portion of a graphics processing engine of a graphics processor, according to at least one embodiment.

FIG. 4 is a block diagram of a graphics processor 400, which may be a discrete graphics processing unit, or may be a graphics processor integrated with a plurality of processing cores. In at least one embodiment, graphics processor 400 communicates via a memory mapped I/O interface to registers on graphics processor 400 and with commands placed into memory. In at least one embodiment, graphics processor 400 includes a memory interface 414 to access memory. In at least one embodiment, memory interface 414 is an interface to local memory, one or more internal caches, one or more shared external caches, and/or to system memory.

In at least one embodiment, graphics processor 400 also includes a display controller 402 to drive display of output data to a display device 420. In at least one embodiment, display controller 402 includes hardware for one or more overlay planes for display device 420 and composition of multiple layers of video or user interface elements. In at least one embodiment, display device 420 can be an internal or external display device. In at least one embodiment, display device 420 is a head mounted display device, such as a virtual reality (VR) display device or an augmented reality (AR) display device. In at least one embodiment, display device is or includes a monitor. In at least one embodiment, graphics processor 400 includes a video codec engine 406 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 400 includes a block image transfer (BLIT) engine 404 to perform two-dimensional (2D) rasterizer operations including, for example, bit-boundary block transfers. However, in at least one embodiment, 2D graphics operations are performed using one or more components of a graphics processing engine (GPE) 410. In at least one embodiment, GPE 410 is a compute engine for performing graphics operations, including three-dimensional (3D) graphics operations and media operations.

In at least one embodiment, GPE 410 includes a 3D pipeline 412 for performing 3D operations, such as rendering three-dimensional images and scenes using processing functions that act upon 3D primitive shapes (e.g., rectangle, triangle, etc.). In at least one embodiment, 3D pipeline 412 includes programmable and fixed function elements that perform various tasks and/or spawn execution threads to a 3D/Media sub-system 415. While 3D pipeline 412 can be used to perform media operations, in at least one embodiment, GPE 410 also includes a media pipeline 416 that is used to perform media operations, such as video post-processing and image enhancement.

In at least one embodiment, media pipeline 416 includes fixed function or programmable logic units to perform one or more specialized media operations, such as video decode acceleration, video de-interlacing, and video encode acceleration in place of, or on behalf of, video codec engine 406. In at least one embodiment, media pipeline 416 additionally includes a thread spawning unit to spawn threads for execution on 3D/Media sub-system 415. In at least one embodiment, spawned threads perform computations for media operations on one or more graphics execution units included in 3D/Media sub-system 415.

In at least one embodiment, 3D/Media subsystem 415 includes logic for executing threads spawned by 3D pipeline 412 and media pipeline 416. In at least one embodiment, 3D pipeline 412 and media pipeline 416 send thread execution requests to 3D/Media subsystem 415, which includes thread dispatch logic for arbitrating and dispatching various requests to available thread execution resources. In at least one embodiment, execution resources include an array of graphics execution units to process 3D and media threads. In at least one embodiment, 3D/Media subsystem 415 includes one or more internal caches for thread instructions and data. In at least one embodiment, subsystem 415 also includes shared memory, including registers and addressable memory, to share data between threads and to store output data.

Buffer identification component 115 is used to identify a specific buffer of a plurality of buffers bound to an application for post-processing, in accordance with one or more embodiments. Details regarding buffer identification component 115 are provided herein in conjunction with FIG. 1. In at least one embodiment portions or all of buffer identification component 115 may be incorporated into graphics processor 400. For example, in at least one embodiment, buffer identification component 115 techniques described herein may use one or more of ALUs embodied in 3D pipeline 412. Moreover, in at least one embodiment, tiler described herein may be done using logic other than logic illustrated in FIG. 1.

Figure 5:
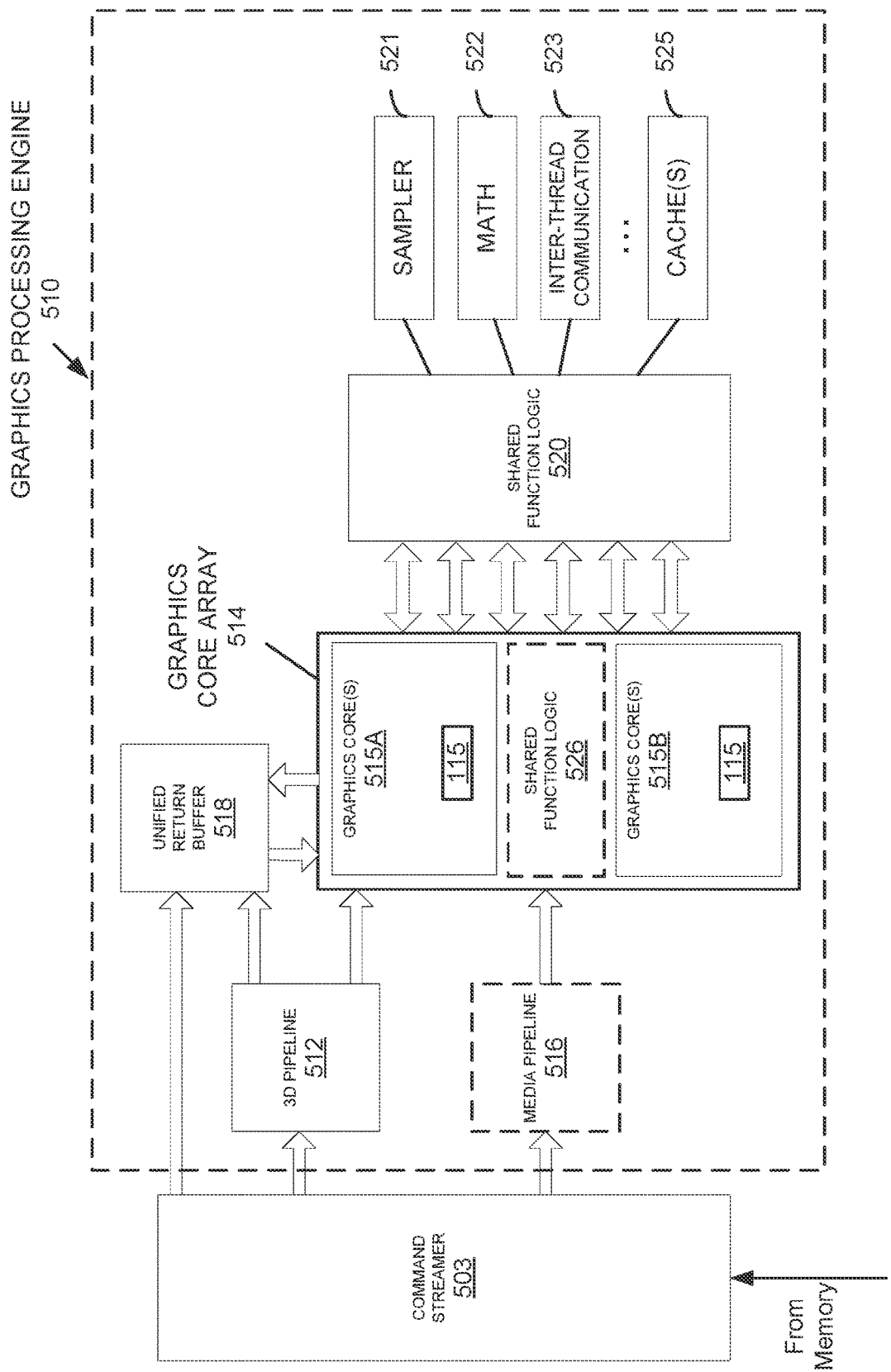
FIG. 5 illustrates a graphics processing engine of a graphics processor, according to at least one embodiment.

FIG. 5 is a block diagram of a graphics processing engine 510 of a graphics processor in accordance with at least one embodiment. In at least one embodiment, graphics processing engine (GPE) 510 is a version of GPE 410 shown in FIG. 4. In at least one embodiment, a media pipeline 516 is optional and may not be explicitly included within GPE 510. In at least one embodiment, a separate media and/or image processor is coupled to GPE 510.

In at least one embodiment, GPE 510 is coupled to or includes a command streamer 503, which provides a command stream to a 3D pipeline 512 and/or media pipeline 516. In at least one embodiment, command streamer 503 is coupled to memory, which can be system memory, or one or more of internal cache memory and shared cache memory. In at least one embodiment, command streamer 503 receives commands from memory and sends commands to 3D pipeline 512 and/or media pipeline 516. In at least one embodiment, commands are instructions, primitives, or micro-operations fetched from a ring buffer, which stores commands for 3D pipeline 512 and media pipeline 516. In at least one embodiment, a ring buffer can additionally include batch command buffers storing batches of multiple commands. In at least one embodiment, commands for 3D pipeline 512 can also include references to data stored in memory, such as, but not limited to, vertex and geometry data for 3D pipeline 512 and/or image data and memory objects for media pipeline 516. In at least one embodiment, 3D pipeline 512 and media pipeline 516 process commands and data by performing operations or by dispatching one or more execution threads to a graphics core array 514. In at least one embodiment, graphics core array 514 includes one or more blocks of graphics cores (e.g., graphics core(s) 515A, graphics core(s) 515B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including buffer identification component 115 in FIG. 1.

In at least one embodiment, 3D pipeline 512 includes fixed function and programmable logic to process one or more shader programs, such as vertex shaders, geometry shaders, pixel shaders, fragment shaders, compute shaders, or other shader programs, by processing instructions and dispatching execution threads to graphics core array 514. In at least one embodiment, graphics core array 514 provides a unified block of execution resources for use in processing shader programs. In at least one embodiment, a multi-purpose execution logic (e.g., execution units) within graphics core(s) 515A-2915B of graphic core array 514 includes support for various 3D API shader languages and can execute multiple simultaneous execution threads associated with multiple shaders.

In at least one embodiment, graphics core array 514 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 514 can output data to memory in a unified return buffer (URB) 518. In at least one embodiment, URB 518 can store data for multiple threads. In at least one embodiment, URB 518 may be used to send data between different threads executing on graphics core array 514. In at least one embodiment, URB 518 may additionally be used for synchronization between threads on graphics core array 514 and fixed function logic within shared function logic 520.

In at least one embodiment, graphics core array 514 is scalable, such that graphics core array 514 includes a variable number of graphics cores, each having a variable number of execution units based on a target power and performance level of GPE 510. In at least one embodiment, execution resources are dynamically scalable, such that execution resources may be enabled or disabled as needed.

In at least one embodiment, graphics core array 514 is coupled to shared function logic 520 that includes multiple resources that are shared between graphics cores in graphics core array 514. In at least one embodiment, shared functions performed by shared function logic 520 are embodied in hardware logic units that provide specialized supplemental functionality to graphics core array 514. In at least one embodiment, shared function logic 520 includes but is not limited to a sampler unit 521, a math unit 522, and inter-thread communication (ITC) logic 529. In at least one embodiment, one or more cache(s) 525 are included in, or coupled to, shared function logic 520.

In at least one embodiment, a shared function is used if demand for a specialized function is insufficient for inclusion within graphics core array 514. In at least one embodiment, a single instantiation of a specialized function is used in shared function logic 520 and shared among other execution resources within graphics core array 514. In at least one embodiment, specific shared functions within shared function logic 520 that are used extensively by graphics core array 514 may be included within shared function logic 520 within graphics core array 514. In at least one embodiment, shared function logic 520 within graphics core array 514 can include some or all logic within shared function logic 520. In at least one embodiment, all logic elements within shared function logic 520 may be duplicated within shared function logic 526 of graphics core array 514. In at least one embodiment, shared function logic 520 is excluded in favor of shared function logic 526 within graphics core array 514.

Buffer identification component 115 is used to identify a specific buffer of a plurality of buffers bound to an application for post-processing, in accordance with one or more embodiments. Details regarding buffer identification component 115 are provided herein in conjunction with FIG. 1. In at least one embodiment portions or all of buffer identification component 115 may be incorporated into graphics processing engine 510.

Figure 6A:
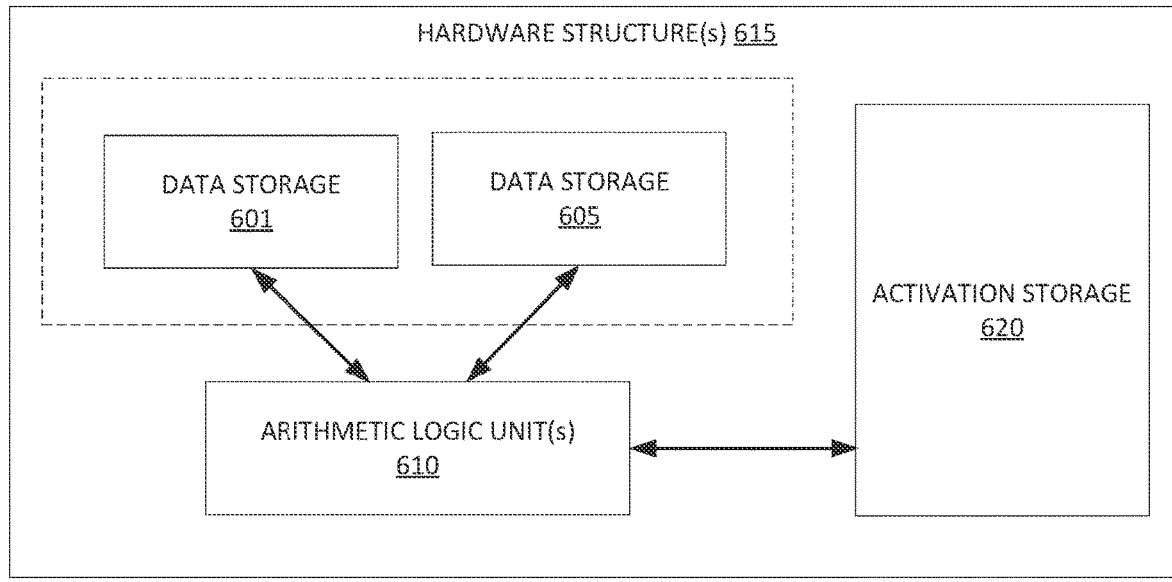
FIG. 6A illustrates inference and/or training logic, according to at least one embodiment.

FIG. 6A illustrates inference and/or training logic 615 used to perform inferencing and/or training operations associated with one or more embodiments. Details regarding inference and/or training logic 615 are provided below in conjunction with FIGS. 6A and/or 6B.

In at least one embodiment, inference and/or training logic 615 may include, without limitation, code and/or data storage 601 to store forward and/or output weight and/or input/output data, and/or other parameters to configure neurons or layers of a neural network trained and/or used for inferencing in aspects of one or more embodiments. In at least one embodiment, training logic 615 may include, or be coupled to code and/or data storage 601 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 601 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 601 may be included with other on-chip or off-chip data storage, including a processor's L1, L2, or L3 cache or system memory.

In at least one embodiment, any portion of code and/or data storage 601 may be internal or external to one or more processors or other hardware logic devices or circuits. In at least one embodiment, code and/or code and/or data storage 601 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 601 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 615 may include, without limitation, a code and/or data storage 605 to store backward and/or output weight and/or input/output data corresponding to neurons or layers of a neural network trained and/or used for inferencing in aspects of one or more embodiments. In at least one embodiment, code and/or data storage 605 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 615 may include, or be coupled to code and/or data storage 605 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 605 may be included with other on-chip or off-chip data storage, including a processor's L1, L2, or L3 cache or system memory. In at least one embodiment, any portion of code and/or data storage 605 may be internal or external to on one or more processors or other hardware logic devices or circuits. In at least one embodiment, code and/or data storage 605 may be cache memory, DRAM, SRAM, non-volatile memory (e.g., Flash memory), or other storage. In at least one embodiment, choice of whether code and/or data storage 605 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 601 and code and/or data storage 605 may be separate storage structures. In at least one embodiment, code and/or data storage 601 and code and/or data storage 605 may be same storage structure. In at least one embodiment, code and/or data storage 601 and code and/or data storage 605 may be partially same storage structure and partially separate storage structures. In at least one embodiment, any portion of code and/or data storage 601 and code and/or data storage 605 may be included with other on-chip or off-chip data storage, including a processor's L1, L2, or L3 cache or system memory.

In at least one embodiment, inference and/or training logic 615 may include, without limitation, one or more arithmetic logic unit(s) ("ALU(s)") 610, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 620 that are functions of input/output and/or weight parameter data stored in code and/or data storage 601 and/or code and/or data storage 605. In at least one embodiment, activations stored in activation storage 620 are generated according to linear algebraic and or matrix-based mathematics performed by ALU(s) 610 in response to performing instructions or other code, wherein weight values stored in code and/or data storage 605 and/or code and/or data storage 601 are used as operands along with other values, such as bias values, gradient information, momentum values, or other parameters or hyperparameters, any or all of which may be stored in code and/or data storage 605 or code and/or data storage 601 or another storage on or off-chip.

In at least one embodiment, ALU(s) 610 are included within one or more processors or other hardware logic devices or circuits, whereas in another embodiment, ALU(s) 610 may be external to a processor or other hardware logic device or circuit that uses them (e.g., a co-processor). In at least one embodiment, ALUs 610 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 601, code and/or data storage 605, and activation storage 620 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 620 may be cache memory, DRAM, SRAM, non-volatile memory (e.g., Flash memory), or other storage. In at least one embodiment, activation storage 620 may be completely or partially within or external to one or more processors or other logical circuits. In at least one embodiment, choice of whether activation storage 620 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 615 illustrated in FIG. 6A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6A may be used in conjunction with central processing unit ("CPU") hardware, graphics processing unit ("GPU") hardware or other hardware, such as data processing unit ("DPU") hardware, or field programmable gate arrays ("FPGAs").

Figure 6B:
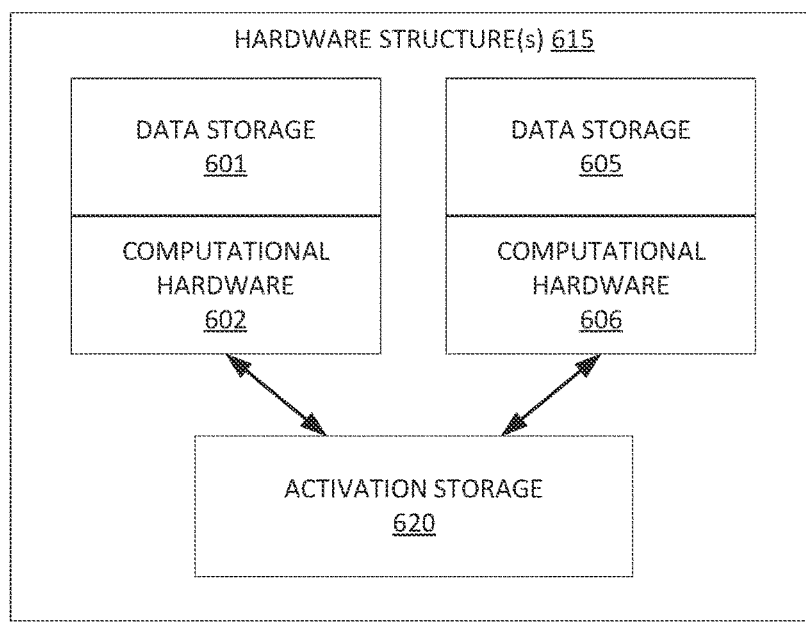
FIG. 6B illustrates inference and/or training logic, according to at least one embodiment.

FIG. 6B illustrates inference and/or training logic 615, according to at least one or more embodiments. In at least one embodiment, inference and/or training logic 615 may include, without limitation, hardware logic in which computational resources are dedicated or otherwise exclusively used in conjunction with weight values or other information corresponding to one or more layers of neurons within a neural network. In at least one embodiment, inference and/or training logic 615 illustrated in FIG. 6B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 6B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 615 includes, without limitation, code and/or data storage 601 and code and/or data storage 605, which may be used to store code (e.g., graph code), weight values and/or other information, including bias values, gradient information, momentum values, and/or other parameter or hyperparameter information. In at least one embodiment illustrated in FIG. 6B, each of code and/or data storage 601 and code and/or data storage 605 is associated with a dedicated computational resource, such as computational hardware 602 and computational hardware 606, respectively. In at least one embodiment, each of computational hardware 602 and computational hardware 606 comprises one or more ALUs that perform mathematical functions, such as linear algebraic functions, only on information stored in code and/or data storage 601 and code and/or data storage 605, respectively, result of which is stored in activation storage 620.

In at least one embodiment, each of code and/or data storage 601 and 605 and corresponding computational hardware 602 and 606, respectively, correspond to different layers of a neural network, such that resulting activation from one "storage/computational pair 601/602" of code and/or data storage 601 and computational hardware 602 is provided as an input to "storage/computational pair 605/606" of code and/or data storage 605 and computational hardware 606, in order to mirror conceptual organization of a neural network. In at least one embodiment, each of storage/computational pairs 601/602 and 605/606 may correspond to more than one neural network layer. In at least one embodiment, additional storage/computation pairs (not shown) subsequent to or in parallel with storage computation pairs 601/602 and 605/606 may be included in inference and/or training logic 615.

Figure 7:
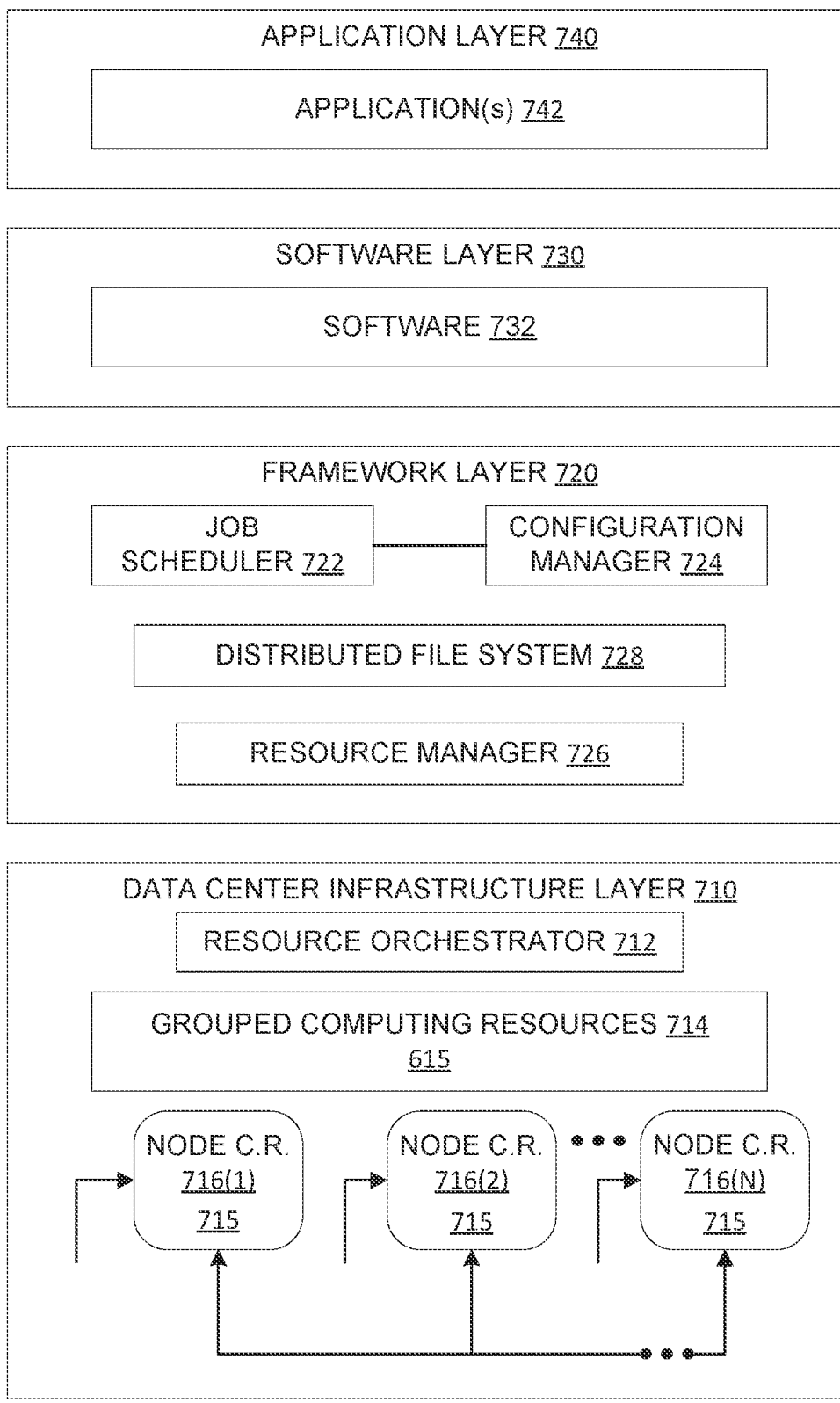
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 7 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 8:
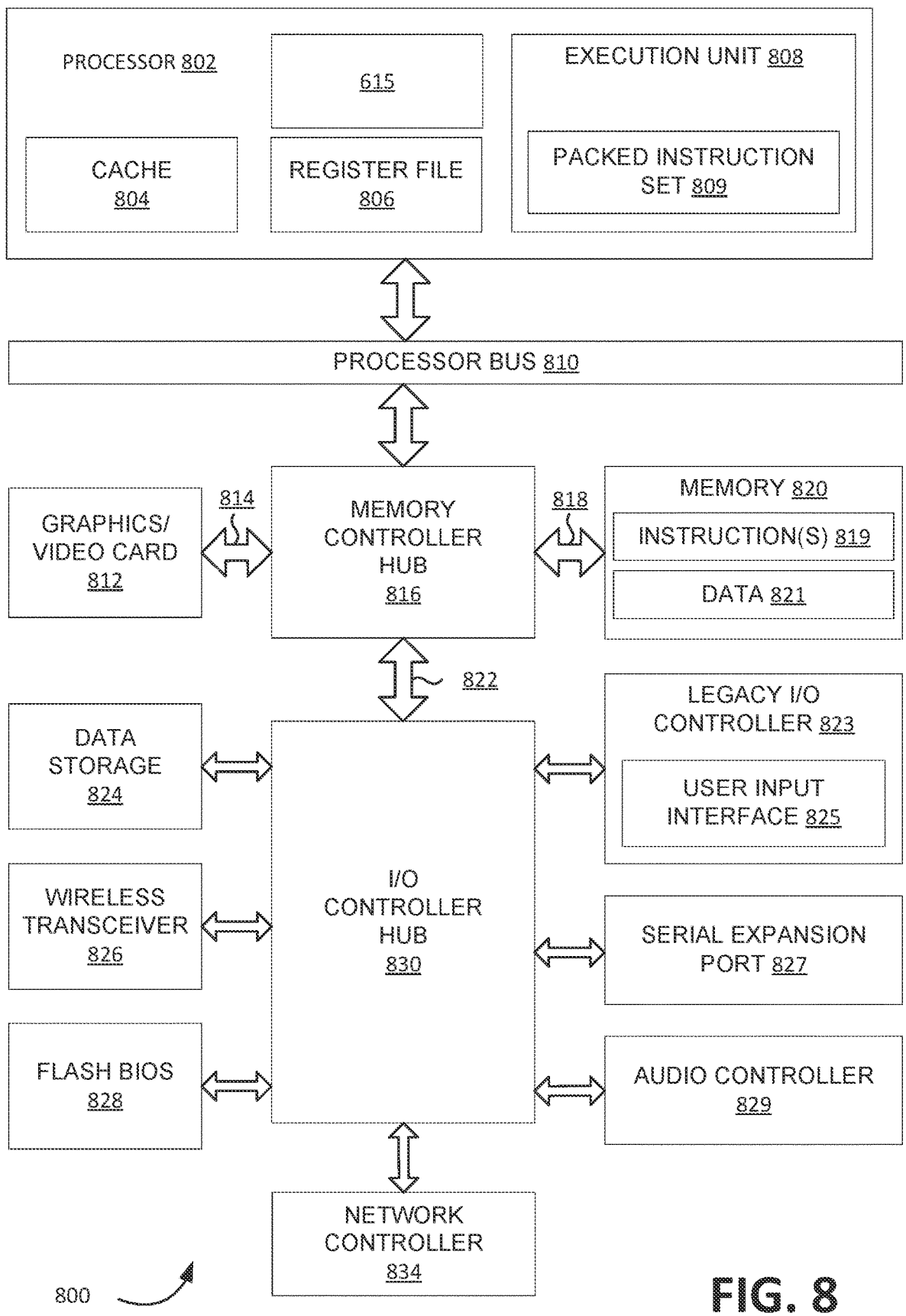
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data, and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834, which may include in some embodiments, a data processing unit. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 8 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 9:
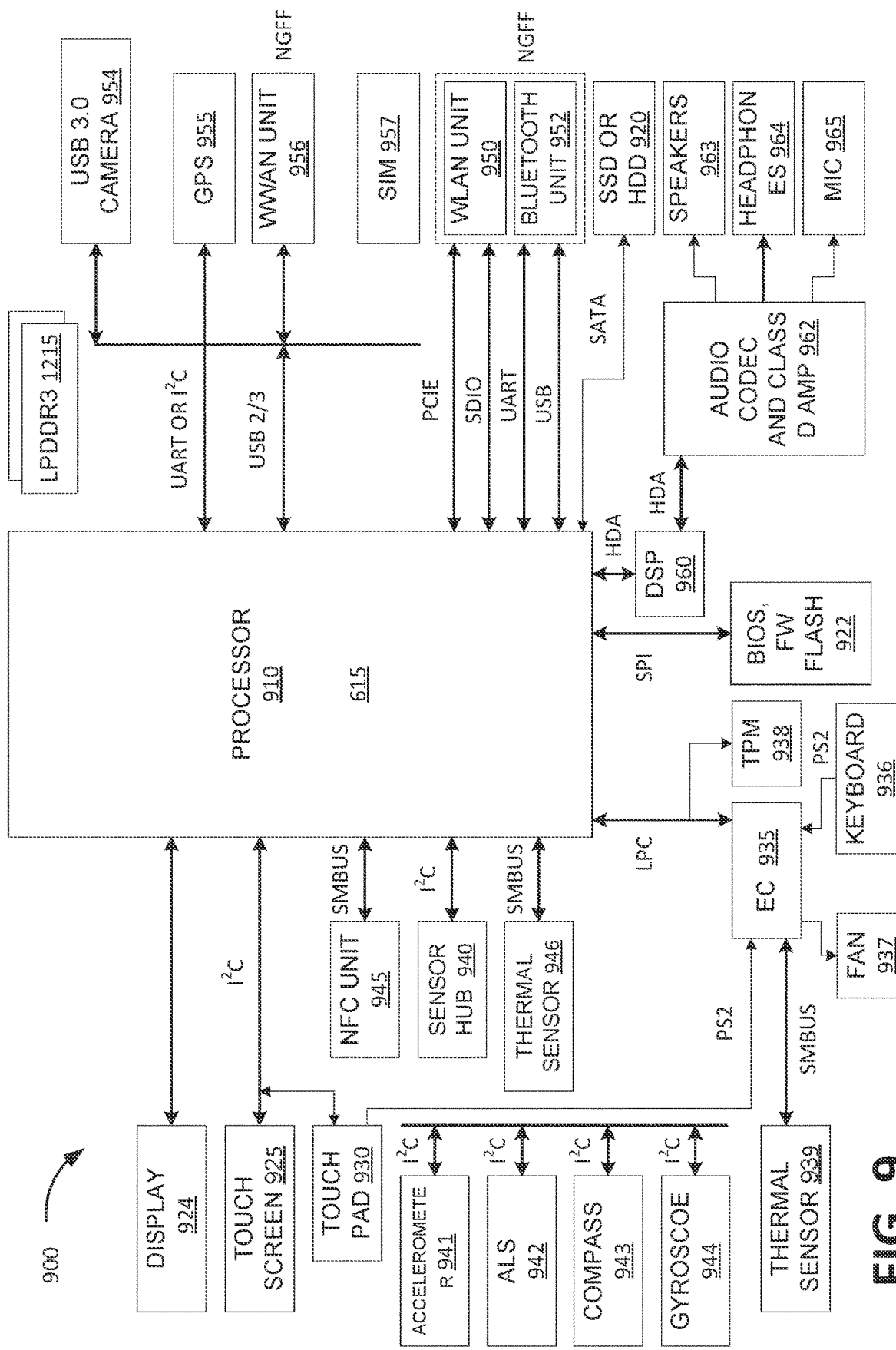
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 936, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 615 are used to perform inferencing and/or training operations associated with one or more embodiments. Details regarding inference and/or training logic 615 are provided below in conjunction with FIGS. 6A and/or 6B. In at least one embodiment, inference and/or training logic 615 may be used in system FIG. 9 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 10:
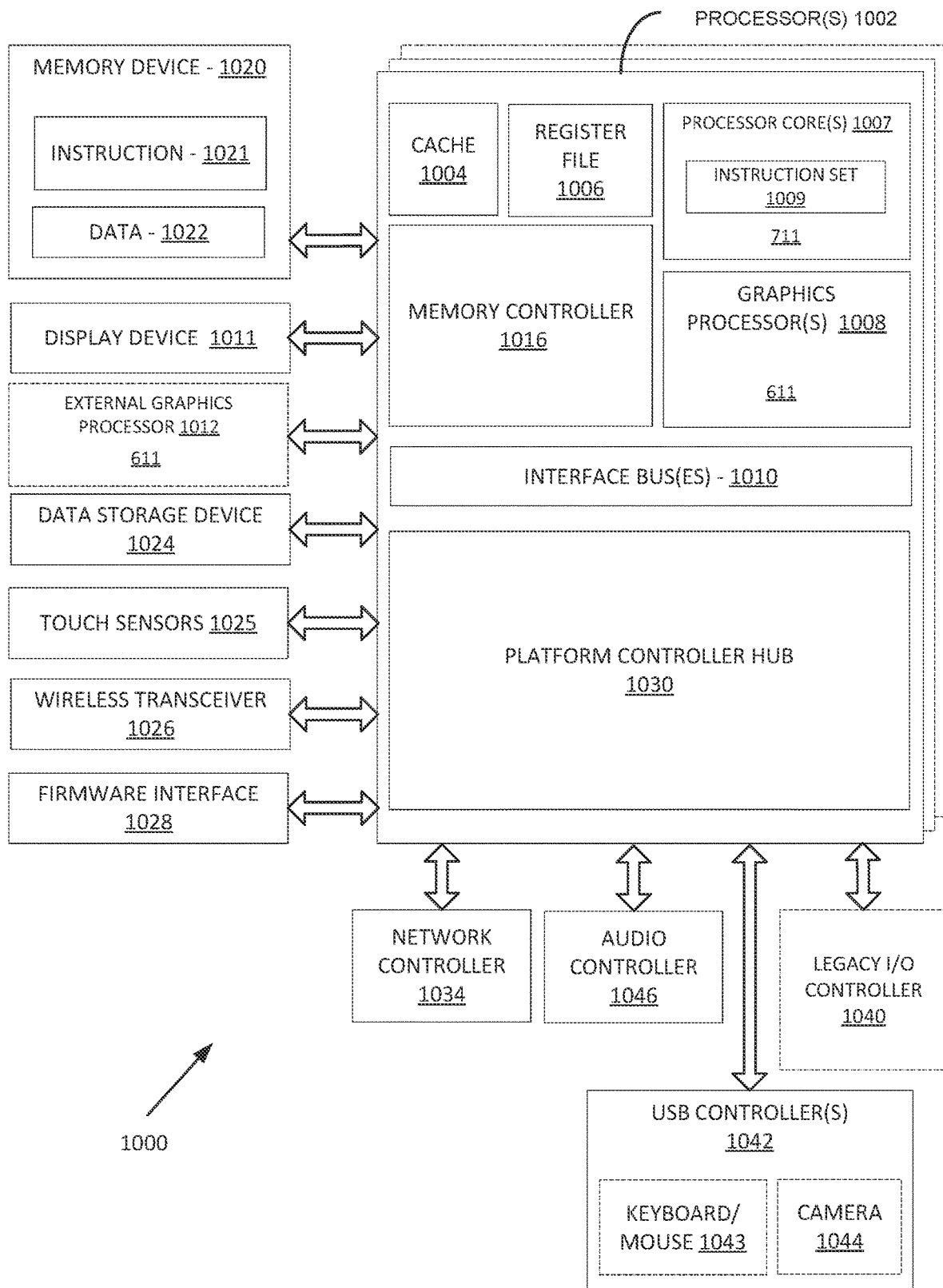
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, edge, or embedded devices.

In at least one embodiment, system 1000 may include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 may also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 may have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, may be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 may be a dynamic random access memory (DRAM) device, a static random access memory (SRAM) device, flash memory device, phase-change memory device, or some other memory device having suitable performance to serve as process memory. In at least one embodiment memory device 1020 may operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 may connect to processor(s) 1002. In at least one embodiment display device 1011 may include one or more of an internal display device, as in a mobile electronic device or a laptop device or an external display device attached via a display interface (e.g., DisplayPort, etc.). In at least one embodiment, display device 1011 may include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 may connect via a storage interface (e.g., SATA) or via a peripheral bus, such as a Peripheral Component Interconnect bus (e.g., PCI, PCI Express). In at least one embodiment, touch sensors 1025 may include touch screen sensors, pressure sensors, or fingerprint sensors. In at least one embodiment, wireless transceiver 1026 may be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and may be, for example, a unified extensible firmware interface (UEFI). In at least one embodiment, network controller 1034 may enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 may also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 may include an external memory controller 1016 and platform controller hub 1030, which may be configured as a memory controller hub and peripheral controller hub within a system chipset that is in communication with processor(s) 1002.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into graphics processor 1100. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 11:
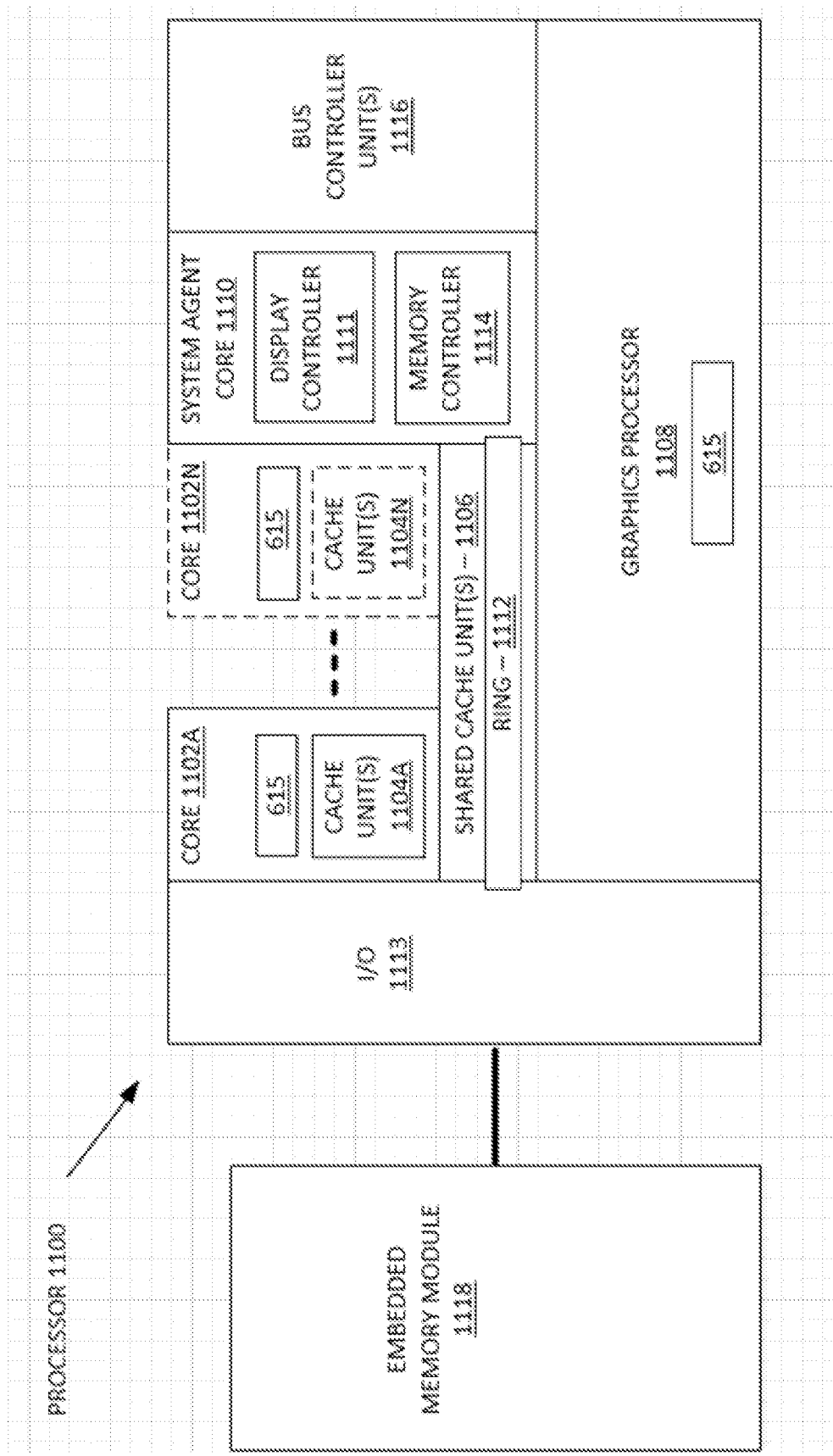
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 may include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 may be implemented on one or more chips or as a SoC integrated circuit.

Inference and/or training logic 615 are used to perform inferencing and/or training operations associated with one or more embodiments. Details regarding inference and/or training logic 615 are provided below in conjunction with FIGS. 6A and/or 6B. In at least one embodiment portions or all of inference and/or training logic 615 may be incorporated into processor 1100. For example, in at least one embodiment, training and/or inferencing techniques described herein may use one or more of ALUs embodied in graphics processor 1108, graphics core(s) 1102A-1102N, or other components in FIG. 11. Moreover, in at least one embodiment, inferencing and/or training operations described herein may be done using logic other than logic illustrated in FIG. 6A or 6B. In at least one embodiment, weight parameters may be stored in on-chip or off-chip memory and/or registers (shown or not shown) that configure ALUs of graphics processor 1100 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 12:
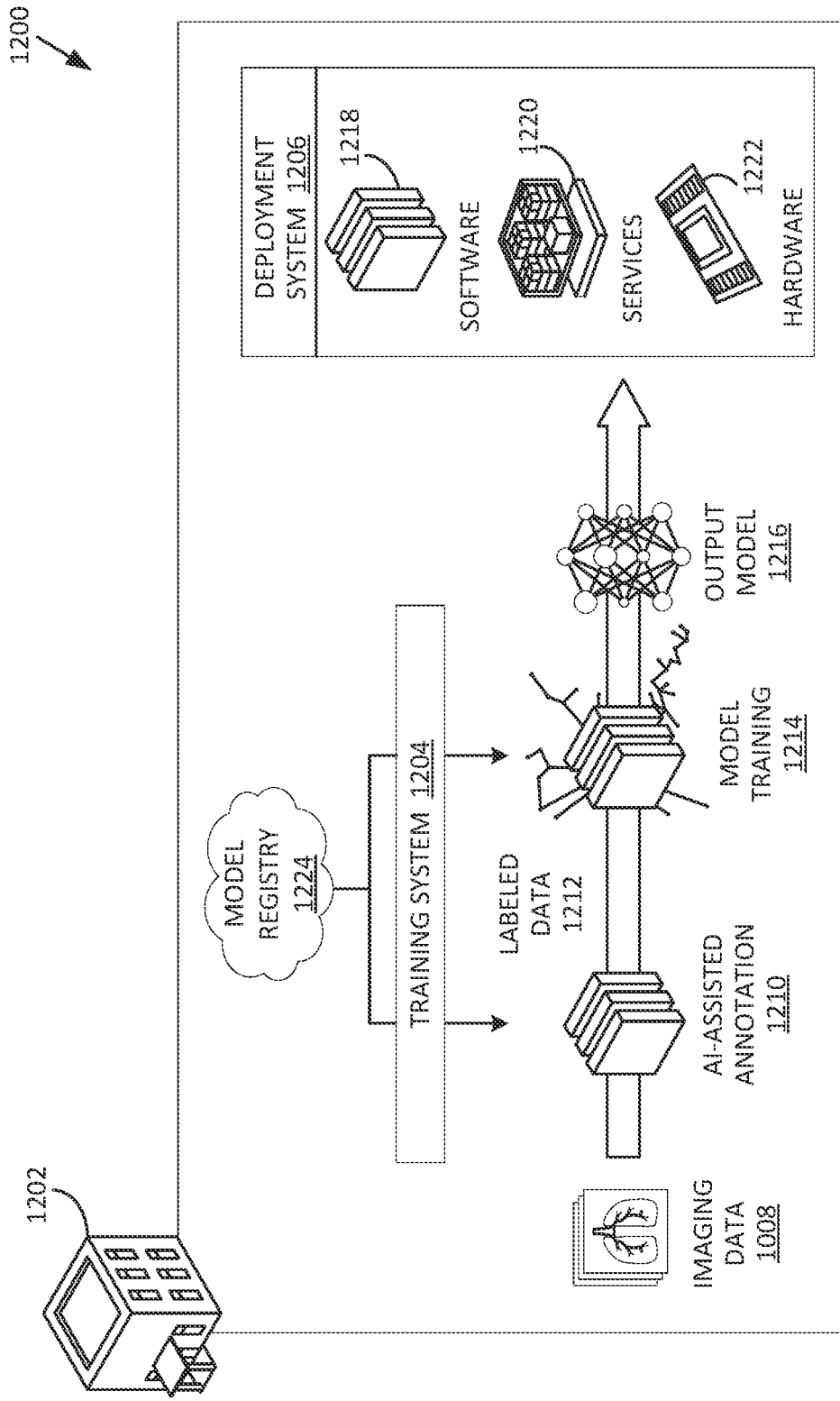
FIG. 12 is an example data flow diagram for an advanced computing pipeline, in accordance with at least one embodiment.

FIG. 12 is an example data flow diagram for a process 1200 of generating and deploying an image processing and inferencing pipeline, in accordance with at least one embodiment. In at least one embodiment, process 1200 may be deployed for use with imaging devices, processing devices, and/or other device types at one or more facilities 1202. Process 1200 may be executed within a training system 1204 and/or a deployment system 1206. In at least one embodiment, training system 1204 may be used to perform training, deployment, and implementation of machine learning models (e.g., neural networks, object detection algorithms, computer vision algorithms, etc.) for use in deployment system 1206. In at least one embodiment, deployment system 1206 may be configured to offload processing and compute resources among a distributed computing environment to reduce infrastructure requirements at facility 1202. In at least one embodiment, one or more applications in a pipeline may use or call upon services (e.g., inference, visualization, compute, AI, etc.) of deployment system 1206 during execution of applications.

In at least one embodiment, some of applications used in advanced processing and inferencing pipelines may use machine learning models or other AI to perform one or more processing steps. In at least one embodiment, machine learning models may be trained at facility 1202 using data 1208 (such as imaging data) generated at facility 1202 (and stored on one or more picture archiving and communication system (PACS) servers at facility 1202), may be trained using imaging or sequencing data 1208 from another facility (ies), or a combination thereof. In at least one embodiment, training system 1204 may be used to provide applications, services, and/or other resources for generating working, deployable machine learning models for deployment system 1206.

In at least one embodiment, model registry 1224 may be backed by object storage that may support versioning and object metadata. In at least one embodiment, object storage may be accessible through, for example, a cloud storage (e.g., cloud 1326 of FIG. 13) compatible application programming interface (API) from within a cloud platform. In at least one embodiment, machine learning models within model registry 1224 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility 1202 is training their own machine learning model, or has an existing machine learning model that needs to be optimized or updated. In at least one embodiment, imaging data 1208 generated by imaging device(s), sequencing devices, and/or other device types may be received. In at least one embodiment, once imaging data 1208 is received, AI-assisted annotation 1210 may be used to aid in generating annotations corresponding to imaging data 1208 to be used as ground truth data for a machine learning model. In at least one embodiment, AI-assisted annotation 1210 may include one or more machine learning models (e.g., convolutional neural networks (CNNs)) that may be trained to generate annotations corresponding to certain types of imaging data 1208 (e.g., from certain devices). In at least one embodiment, AI-assisted annotations 1210 may then be used directly, or may be adjusted or fine-tuned using an annotation tool to generate ground truth data. In at least one embodiment, AI-assisted annotations 1210, labeled clinic data 1212, or a combination thereof may be used as ground truth data for training a machine learning model. In at least one embodiment, a trained machine learning model may be referred to as output model 1216, and may be used by deployment system 1206, as described herein.

In at least one embodiment, training pipeline 1304 (FIG. 13) may include a scenario where facility 1202 needs a machine learning model for use in performing one or more processing tasks for one or more applications in deployment system 1206, but facility 1202 may not currently have such a machine learning model (or may not have a model that is optimized, efficient, or effective for such purposes). In at least one embodiment, an existing machine learning model may be selected from a model registry 1224. In at least one embodiment, model registry 1224 may include machine learning models trained to perform a variety of different inference tasks on imaging data. In at least one embodiment, machine learning models in model registry 1224 may have been trained on imaging data from different facilities than facility 1202 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1224. In at least one embodiment, a machine learning model may then be retrained, or updated, at any number of other facilities, and a retrained or updated model may be made available in model registry 1224. In at least one embodiment, a machine learning model may then be selected from model registry 1224— and referred to as output model 1216— and may be used in deployment system 1206 to perform one or more processing tasks for one or more applications of a deployment system.

In at least one embodiment, training pipeline 1304 (FIG. 13), a scenario may include facility 1202 requiring a machine learning model for use in performing one or more processing tasks for one or more applications in deployment system 1206, but facility 1202 may not currently have such a machine learning model (or may not have a model that is optimized, efficient, or effective for such purposes). In at least one embodiment, a machine learning model selected from model registry 1224 may not be fine-tuned or optimized for imaging data 1208 generated at facility 1202 because of differences in populations, robustness of training data used to train a machine learning model, diversity in anomalies of training data, and/or other issues with training data. In at least one embodiment, AI-assisted annotation 1210 may be used to aid in generating annotations corresponding to imaging data 1208 to be used as ground truth data for retraining or updating a machine learning model. In at least one embodiment, labeled data 1212 may be used as ground truth data for training a machine learning model. In at least one embodiment, retraining or updating a machine learning model may be referred to as model training 1214. In at least one embodiment, model training 1214—e.g., AI-assisted annotations 1210, labeled clinic data 1212, or a combination thereof—may be used as ground truth data for retraining or updating a machine learning model. In at least one embodiment, a trained machine learning model may be referred to as output model 1216, and may be used by deployment system 1206, as described herein.

In at least one embodiment, deployment system 1206 may include software 1218, services 1220, hardware 1222, and/or other components, features, and functionality. In at least one embodiment, deployment system 1206 may include a software "stack," such that software 1218 may be built on top of services 1220 and may use services 1220 to perform some or all of processing tasks, and services 1220 and software 1218 may be built on top of hardware 1222 and use hardware 1222 to execute processing, storage, and/or other compute tasks of deployment system 1206. In at least one embodiment, software 1218 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1208, in addition to containers that receive and configure imaging data for use by each container and/or for use by facility 1202 after processing through a pipeline (e.g., to convert outputs back to a usable data type). In at least one embodiment, a combination of containers within software 1218 (e.g., that make up a pipeline) may be referred to as a virtual instrument (as described in more detail herein), and a virtual instrument may leverage services 1220 and hardware 1222 to execute some or all processing tasks of applications instantiated in containers.

In at least one embodiment, a data processing pipeline may receive input data (e.g., imaging data 1208) in a specific format in response to an inference request (e.g., a request from a user of deployment system 1206). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1216 of training system 1204.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1224 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1220 as a system (e.g., system 1300 of FIG. 13). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1300 (e.g., for accuracy), an application may be available in a container registry for selection and/or implementation by a user to perform one or more processing tasks with respect to data at a facility (e.g., a second facility) of a user.

Figure 13:
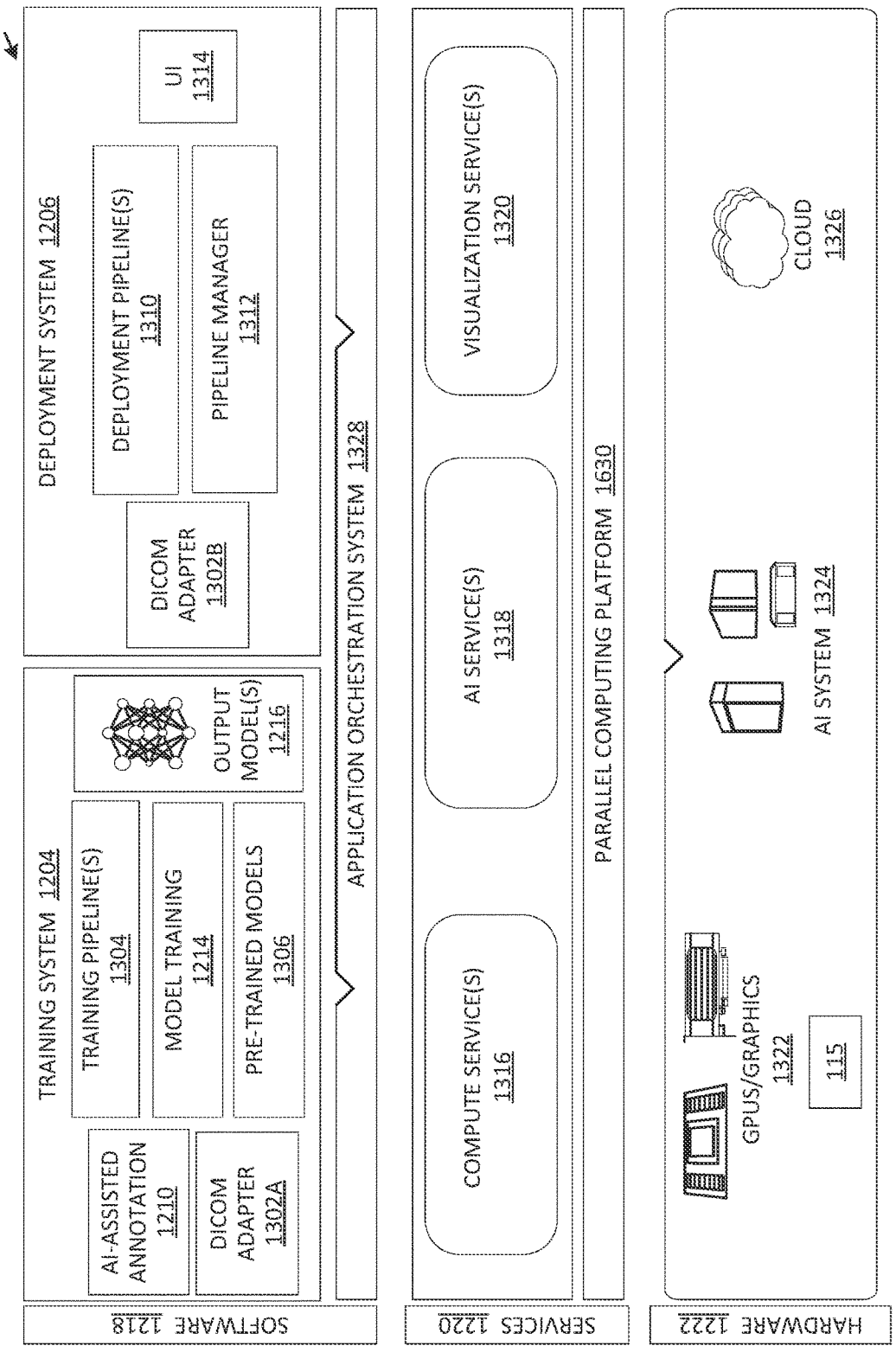
FIG. 13 is a system diagram for an example system for training, adapting, instantiating, and deploying machine learning models in an advanced computing pipeline, in accordance with at least one embodiment.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1224. In at least one embodiment, a requesting entity—who provides an inference or image processing request—may browse a container registry and/or model registry 1224 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1206 (e.g., a cloud) to perform processing of data processing pipeline. In at least one embodiment, processing by deployment system 1206 may include referencing selected elements (e.g., applications, containers, models, etc.) from a container registry and/or model registry 1224. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1220 may be leveraged. In at least one embodiment, services 1220 may include compute services, artificial intelligence (AI) services, visualization services, and/or other service types. In at least one embodiment, services 1220 may provide functionality that is common to one or more applications in software 1218, so functionality may be abstracted to a service that may be called upon or leveraged by applications. In at least one embodiment, functionality provided by services 1220 may run dynamically and more efficiently, while also scaling well by allowing applications to process data in parallel (e.g., using a parallel computing platform 1330 (FIG. 13)). In at least one embodiment, rather than each application that shares a same functionality offered by a service 1220 being required to have a respective instance of service 1220, service 1220 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc. — to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1220 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1218 implementing advanced processing and inferencing pipeline that includes segmentation application and anomaly detection application may be streamlined because each application may call upon a same inference service to perform one or more inferencing tasks.

In at least one embodiment, hardware 1222 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1222 may be used to provide efficient, purpose-built support for software 1218 and services 1220 in deployment system 1206. In at least one embodiment, use of GPU processing may be implemented for processing locally (e.g., at facility 1202), within an AI/deep learning system, in a cloud system, and/or in other processing components of deployment system 1206 to improve efficiency, accuracy, and efficacy of image processing and generation. In at least one embodiment, software 1218 and/or services 1220 may be optimized for GPU processing with respect to deep learning, machine learning, and/or high-performance computing, as non-limiting examples. In at least one embodiment, at least some of computing environment of deployment system 1206 and/or training system 1204 may be executed in a datacenter one or more supercomputers or high performance computing systems, with GPU optimized software (e.g., hardware and software combination of NVIDIA's DGX System). In at least one embodiment, hardware 1222 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 13 is a system diagram for an example system 1300 for generating and deploying an imaging deployment pipeline, in accordance with at least one embodiment. In at least one embodiment, system 1300 may be used to implement process 1200 of FIG. 12 and/or other processes including advanced processing and inferencing pipelines. In at least one embodiment, system 1300 may include training system 1204 and deployment system 1206. In at least one embodiment, training system 1204 and deployment system 1206 may be implemented using software 1218, services 1220, and/or hardware 1222, as described herein.

In at least one embodiment, system 1300 (e.g., training system 1204 and/or deployment system 1206) may implemented in a cloud computing environment (e.g., using cloud 1326). In at least one embodiment, system 1300 may be implemented locally with respect to a healthcare services facility, or as a combination of both cloud and local computing resources. In at least one embodiment, access to APIs in cloud 1326 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1300, may be restricted to a set of public IPs that have been vetted or authorized for interaction.

In at least one embodiment, various components of system 1300 may communicate between and among one another using any of a variety of different network types, including but not limited to local area networks (LANs) and/or wide area networks (WANs) via wired and/or wireless communication protocols. In at least one embodiment, communication between facilities and components of system 1300 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1204 may execute training pipelines 1304, similar to those described herein with respect to FIG. 12. In at least one embodiment, where one or more machine learning models are to be used in deployment pipelines 1310 by deployment system 1206, training pipelines 1304 may be used to train or retrain one or more (e.g. pre-trained) models, and/or implement one or more of pre-trained models 1306 (e.g., without a need for retraining or updating). In at least one embodiment, as a result of training pipelines 1304, output model(s) 1216 may be generated. In at least one embodiment, training pipelines 1304 may include any number of processing steps, such as but not limited to imaging data (or other input data) conversion or adaption In at least one embodiment, for different machine learning models used by deployment system 1206, different training pipelines 1304 may be used. In at least one embodiment, training pipeline 1304 similar to a first example described with respect to FIG. 12 may be used for a first machine learning model, training pipeline 1304 similar to a second example described with respect to FIG. 12 may be used for a second machine learning model, and training pipeline 1304 similar to a third example described with respect to FIG. 12 may be used for a third machine learning model. In at least one embodiment, any combination of tasks within training system 1204 may be used depending on what is required for each respective machine learning model. In at least one embodiment, one or more of machine learning models may already be trained and ready for deployment so machine learning models may not undergo any processing by training system 1204, and may be implemented by deployment system 1206.

In at least one embodiment, output model(s) 1216 and/or pre-trained model(s) 1306 may include any types of machine learning models depending on implementation or embodiment. In at least one embodiment, and without limitation, machine learning models used by system 1300 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 14A:
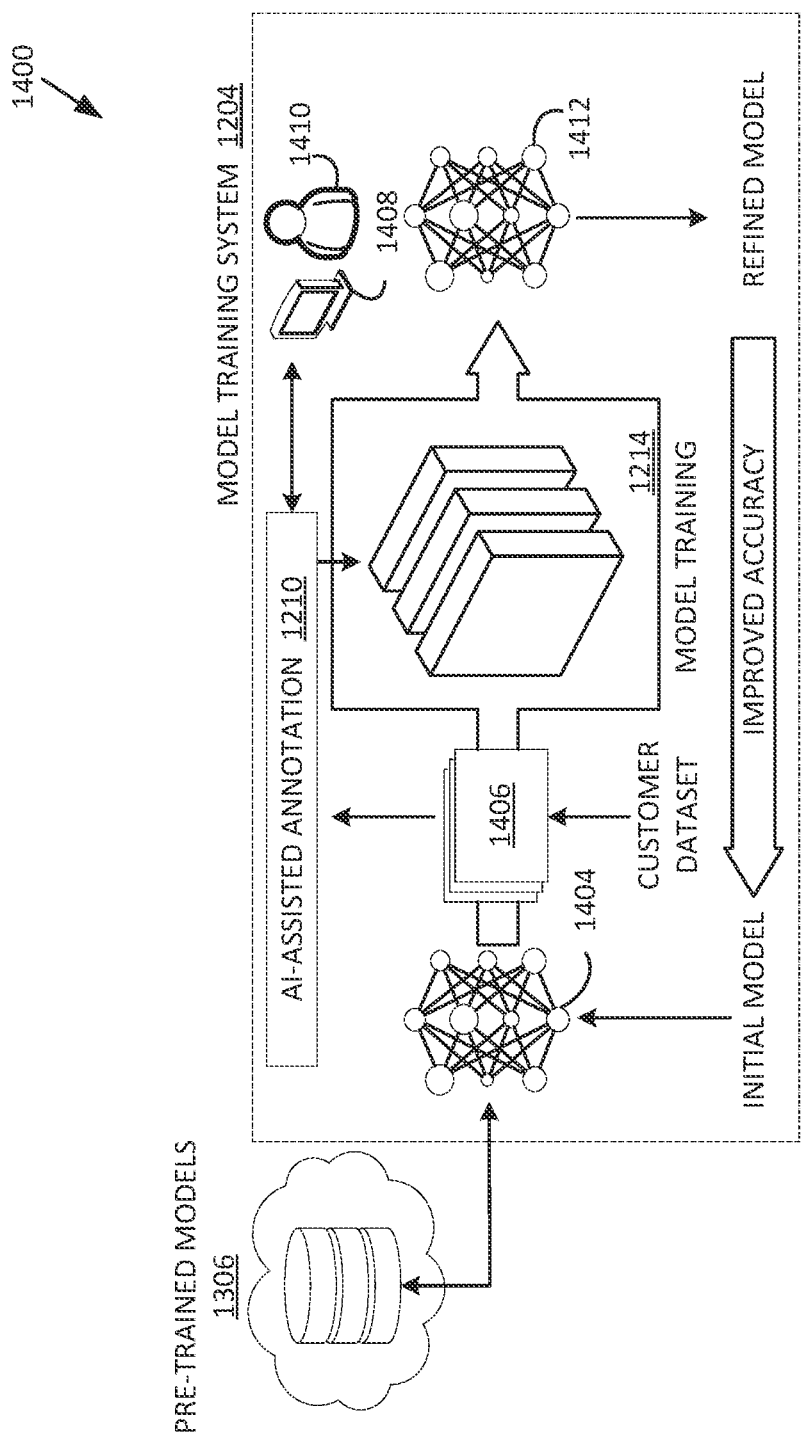
FIGS. 14A and 14B illustrate a data flow diagram for a process to train a machine learning model, as well as client-server architecture to enhance annotation tools with pre-trained annotation models, in accordance with at least one embodiment.
Figure 14B:
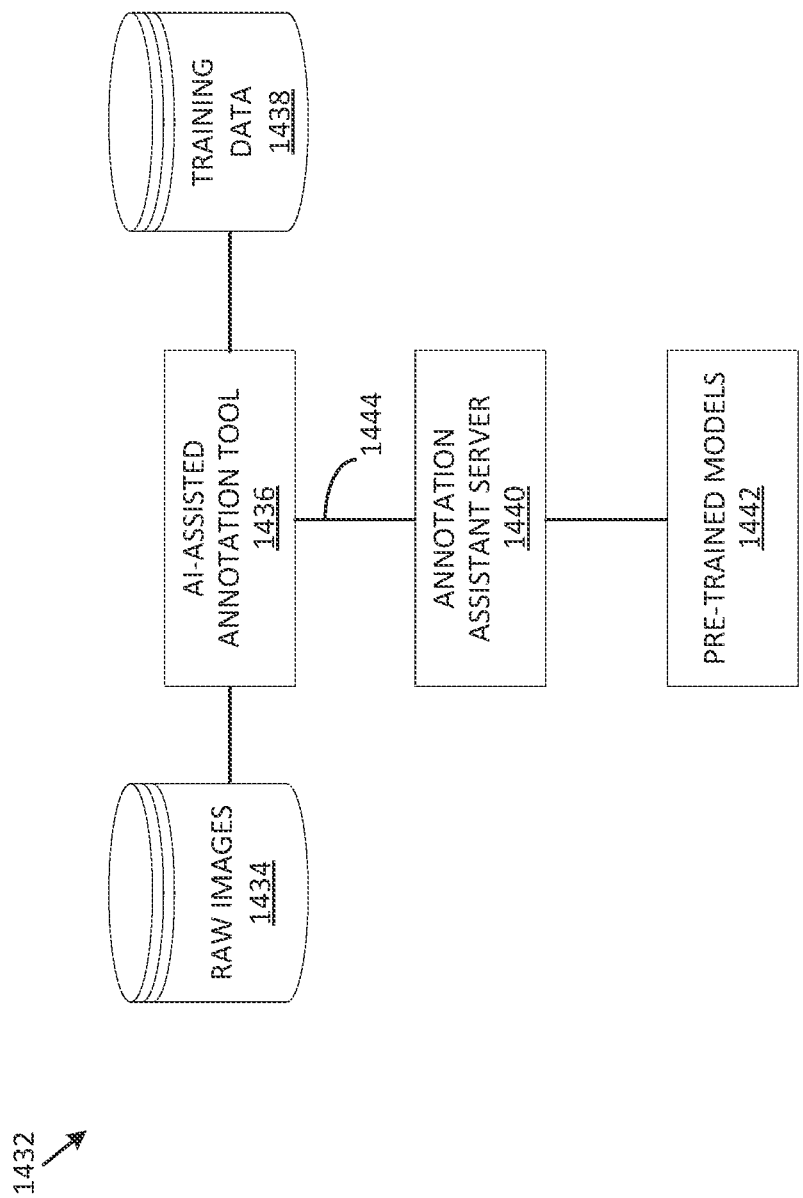

In at least one embodiment, training pipelines 1304 may include AI-assisted annotation, as described in more detail herein with respect to at least FIG. 14B. In at least one embodiment, labeled data 1212 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1208 (or other data type used by machine learning models), there may be corresponding ground truth data generated by training system 1204. In at least one embodiment, AI-assisted annotation may be performed as part of deployment pipelines 1310; either in addition to, or in lieu of AI-assisted annotation included in training pipelines 1304. In at least one embodiment, system 1300 may include a multi-layer platform that may include a software layer (e.g., software 1218) of diagnostic applications (or other application types) that may perform one or more medical imaging and diagnostic functions. In at least one embodiment, system 1300 may be communicatively coupled to (e.g., via encrypted links) PACS server networks of one or more facilities. In at least one embodiment, system 1300 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1202). In at least one embodiment, applications may then call or execute one or more services 1220 for performing compute, AI, or visualization tasks associated with respective applications, and software 1218 and/or services 1220 may leverage hardware 1222 to perform processing tasks in an effective and efficient manner.

In at least one embodiment, deployment system 1206 may execute deployment pipelines 1310. In at least one embodiment, deployment pipelines 1310 may include any number of applications that may be sequentially, non-sequentially, or otherwise applied to imaging data (and/or other data types) generated by imaging devices, sequencing devices, genomics devices, etc.— including AI-assisted annotation, as described above. In at least one embodiment, as described herein, a deployment pipeline 1310 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1310 depending on information desired from data generated by a device. In at least one embodiment, where detections of anomalies are desired from an MRI machine, there may be a first deployment pipeline 1310, and where image enhancement is desired from output of an MII machine, there may be a second deployment pipeline 1310.

In at least one embodiment, an image generation application may include a processing task that includes use of a machine learning model. In at least one embodiment, a user may desire to use their own machine learning model, or to select a machine learning model from model registry 1224. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1300— such as services 1220 and hardware 1222—deployment pipelines 1310 may be even more user friendly, provide for easier integration, and produce more accurate, efficient, and timely results.

In at least one embodiment, deployment system 1206 may include a user interface 1314 (e.g., a graphical user interface, a web interface, etc.) that may be used to select applications for inclusion in deployment pipeline(s) 1310, arrange applications, modify, or change applications or parameters or constructs thereof, use and interact with deployment pipeline(s) 1310 during set-up and/or deployment, and/or to otherwise interact with deployment system 1206. In at least one embodiment, although not illustrated with respect to training system 1204, user interface 1314 (or a different user interface) may be used for selecting models for use in deployment system 1206, for selecting models for training, or retraining, in training system 1204, and/or for otherwise interacting with training system 1204.

In at least one embodiment, pipeline manager 1312 may be used, in addition to an application orchestration system 1328, to manage interaction between applications or containers of deployment pipeline(s) 1310 and services 1220 and/or hardware 1222. In at least one embodiment, pipeline manager 1312 may be configured to facilitate interactions from application to application, from application to service 1220, and/or from application or service to hardware 1222. In at least one embodiment, although illustrated as included in software 1218, this is not intended to be limiting, and in some examples (e.g., as illustrated in FIG. 11) pipeline manager 1312 may be included in services 1220. In at least one embodiment, application orchestration system 1328 (e.g., Kubernetes, DOCKER, etc.) may include a container orchestration system that may group applications into containers as logical units for coordination, management, scaling, and deployment. In at least one embodiment, by associating applications from deployment pipeline(s) 1310 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1312 and application orchestration system 1328. In at least one embodiment, so long as an expected input and/or output of each container or application is known by a system (e.g., based on constructs of applications or containers), application orchestration system 1328 and/or pipeline manager 1312 may facilitate communication among and between, and sharing of resources among and between, each of applications or containers. In at least one embodiment, because one or more of applications or containers in deployment pipeline(s) 1310 may share same services and resources, application orchestration system 1328 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1328) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1220 leveraged by and shared by applications or containers in deployment system 1206 may include compute services 1316, AI services 1318, visualization services 1320, and/or other service types. In at least one embodiment, applications may call (e.g., execute) one or more of services 1220 to perform processing operations for an application. In at least one embodiment, compute services 1316 may be leveraged by applications to perform super-computing or other high-performance computing (HPC) tasks. In at least one embodiment, compute service(s) 1316 may be leveraged to perform parallel processing (e.g., using a parallel computing platform 1330) for processing data through one or more of applications and/or one or more tasks of a single application, substantially simultaneously. In at least one embodiment, parallel computing platform 1330 (e.g., NVIDIA's CUDA) may enable general purpose computing on GPUs (GPGPU) (e.g., GPUs 1322). In at least one embodiment, a software layer of parallel computing platform 1330 may provide access to virtual instruction sets and parallel computational elements of GPUs, for execution of compute kernels. In at least one embodiment, parallel computing platform 1330 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1330 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1318 may be leveraged to perform inferencing services for executing machine learning model(s) associated with applications (e.g., tasked with performing one or more processing tasks of an application). In at least one embodiment, AI services 1318 may leverage AI system 1324 to execute machine learning model(s) (e.g., neural networks, such as CNNs) for segmentation, reconstruction, object detection, feature detection, classification, and/or other inferencing tasks. In at least one embodiment, applications of deployment pipeline(s) 1310 may use one or more of output models 1216 from training system 1204 and/or other models of applications to perform inference on imaging data. In at least one embodiment, two or more examples of inferencing using application orchestration system 1328 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1328 may distribute resources (e.g., services 1220 and/or hardware 1222) based on priority paths for different inferencing tasks of AI services 1318.

In at least one embodiment, shared storage may be mounted to AI services 1318 within system 1300. In at least one embodiment, shared storage may operate as a cache (or other storage device type) and may be used to process inference requests from applications. In at least one embodiment, when an inference request is submitted, a request may be received by a set of API instances of deployment system 1206, and one or more instances may be selected (e.g., for best fit, for load balancing, etc.) to process a request. In at least one embodiment, to process a request, a request may be entered into a database, a machine learning model may be located from model registry 1224 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1312) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<9 min). In at least one embodiment, model execution times may be measured from requesting institution or entity and may include partner network traversal time, as well as execution on an inference service.

In at least one embodiment, transfer of requests between services 1220 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1326, and an inference service may perform inferencing on a GPU.

In at least one embodiment, visualization services 1320 may be leveraged to generate visualizations for viewing outputs of applications and/or deployment pipeline(s) 1310. In at least one embodiment, GPUs 1322 may be leveraged by visualization services 1320 to generate visualizations. In at least one embodiment, rendering effects, such as ray-tracing, may be implemented by visualization services 1320 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1320 may include an internal visualizer, cinematics, and/or other rendering or image processing capabilities or functionality (e.g., ray tracing, rasterization, internal optics, etc.).

In at least one embodiment, hardware 1222 may include GPUs 1322, AI system 1324, cloud 1326, and/or any other hardware used for executing training system 1204 and/or deployment system 1206. In at least one embodiment, GPUs 1322 (e.g., NVIDIA's TESLA and/or QUADRO GPUs) may include any number of GPUs that may be used for executing processing tasks of compute services 1316, AI services 1318, visualization services 1320, other services, and/or any of features or functionality of software 1218. For example, with respect to AI services 1318, GPUs 1322 may be used to perform pre-processing on imaging data (or other data types used by machine learning models), post-processing on outputs of machine learning models, and/or to perform inferencing (e.g., to execute machine learning models). In at least one embodiment, cloud 1326, AI system 1324, and/or other components of system 1300 may use GPUs 1322. In at least one embodiment, cloud 1326 may include a GPU-optimized platform for deep learning tasks. In at least one embodiment, AI system 1324 may use GPUs, and cloud 1326— or at least a portion tasked with deep learning or inferencing—may be executed using one or more AI systems 1324. As such, although hardware 1222 is illustrated as discrete components, this is not intended to be limiting, and any components of hardware 1222 may be combined with, or leveraged by, any other components of hardware 1222.

In at least one embodiment, AI system 1324 may include a purpose-built computing system (e.g., a super-computer or an HPC) configured for inferencing, deep learning, machine learning, and/or other artificial intelligence tasks. In at least one embodiment, AI system 1324 (e.g., NVIDIA's DGX) may include GPU-optimized software (e.g., a software stack) that may be executed using a plurality of GPUs 1322, in addition to DPUs, CPUs, RAM, storage, and/or other components, features, or functionality. In at least one embodiment, one or more AI systems 1324 may be implemented in cloud 1326 (e.g., in a data center) for performing some or all of AI-based processing tasks of system 1300.

In at least one embodiment, cloud 1326 may include a GPU-accelerated infrastructure (e.g., NVIDIA's NGC) that may provide a GPU-optimized platform for executing processing tasks of system 1300. In at least one embodiment, cloud 1326 may include an AI system(s) 1324 for performing one or more of AI-based tasks of system 1300 (e.g., as a hardware abstraction and scaling platform). In at least one embodiment, cloud 1326 may integrate with application orchestration system 1328 leveraging multiple GPUs to enable seamless scaling and load balancing between and among applications and services 1220. In at least one embodiment, cloud 1326 may tasked with executing at least some of services 1220 of system 1300, including compute services 1316, AI services 1318, and/or visualization services 1320, as described herein. In at least one embodiment, cloud 1326 may perform small and large batch inference (e.g., executing NVIDIA's TENSOR RT), provide an accelerated parallel computing API and platform 1330 (e.g., NVIDIA's CUDA), execute application orchestration system 1328 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1300.

FIG. 14A illustrates a data flow diagram for a process 1400 to train, retrain, or update a machine learning model, in accordance with at least one embodiment. In at least one embodiment, process 1400 may be executed using, as a non-limiting example, system 1300 of FIG. 13. In at least one embodiment, process 1400 may leverage services 1220 and/or hardware 1222 of system 1300, as described herein. In at least one embodiment, refined models 1412 generated by process 1400 may be executed by deployment system 1206 for one or more containerized applications in deployment pipelines 1310.

In at least one embodiment, model training 1214 may include retraining or updating an initial model 1404 (e.g., a pre-trained model) using new training data (e.g., new input data, such as customer dataset 1406, and/or new ground truth data associated with input data). In at least one embodiment, to retrain, or update, initial model 1404, output or loss layer(s) of initial model 1404 may be reset, or deleted, and/or replaced with an updated or new output or loss layer(s). In at least one embodiment, initial model 1404 may have previously fine-tuned parameters (e.g., weights and/or biases) that remain from prior training, so training or retraining 1214 may not take as long or require as much processing as training a model from scratch. In at least one embodiment, during model training 1214, by having reset or replaced output or loss layer(s) of initial model 1404, parameters may be updated and re-tuned for a new data set based on loss calculations associated with accuracy of output or loss layer(s) at generating predictions on new, customer dataset 1406 (e.g., image data 1208 of FIG. 12).

In at least one embodiment, pre-trained models 1306 may be stored in a data store, or registry (e.g., model registry 1224 of FIG. 12). In at least one embodiment, pre-trained models 1306 may have been trained, at least in part, at one or more facilities other than a facility executing process 1400. In at least one embodiment, to protect privacy and rights of patients, subjects, or clients of different facilities, pre-trained models 1306 may have been trained, on-premise, using customer or patient data generated on-premise. In at least one embodiment, pre-trained models 1306 may be trained using cloud 1326 and/or other hardware 1222, but confidential, privacy protected patient data may not be transferred to, used by, or accessible to any components of cloud 1326 (or other off premise hardware). In at least one embodiment, where a pre-trained model 1306 is trained at using patient data from more than one facility, pre-trained model 1306 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1306 on-premise and/or off premise, such as in a datacenter or other cloud computing infrastructure.

In at least one embodiment, when selecting applications for use in deployment pipelines 1310, a user may also select machine learning models to be used for specific applications. In at least one embodiment, a user may not have a model for use, so a user may select a pre-trained model 1306 to use with an application. In at least one embodiment, pre-trained model 1306 may not be optimized for generating accurate results on customer dataset 1406 of a facility of a user (e.g., based on patient diversity, demographics, types of medical imaging devices used, etc.). In at least one embodiment, prior to deploying pre-trained model 1306 into deployment pipeline 1310 for use with an application(s), pre-trained model 1306 may be updated, retrained, and/or fine-tuned for use at a respective facility.

In at least one embodiment, a user may select pre-trained model 1306 that is to be updated, retrained, and/or fine-tuned, and pre-trained model 1306 may be referred to as initial model 1404 for training system 1204 within process 1400. In at least one embodiment, customer dataset 1406 (e.g., imaging data, genomics data, sequencing data, or other data types generated by devices at a facility) may be used to perform model training 1214 (which may include, without limitation, transfer learning) on initial model 1404 to generate refined model 1412. In at least one embodiment, ground truth data corresponding to customer dataset 1406 may be generated by training system 1204. In at least one embodiment, ground truth data may be generated, at least in part, by clinicians, scientists, doctors, practitioners, at a facility (e.g., as labeled clinic data 1212 of FIG. 12).

In at least one embodiment, AI-assisted annotation 1210 may be used in some examples to generate ground truth data. In at least one embodiment, AI-assisted annotation 1210 (e.g., implemented using an AI-assisted annotation SDK) may leverage machine learning models (e.g., neural networks) to generate suggested or predicted ground truth data for a customer dataset. In at least one embodiment, user 1410 may use annotation tools within a user interface (a graphical user interface (GUI)) on computing device 1408.

In at least one embodiment, user 1410 may interact with a GUI via computing device 1408 to edit or fine-tune (auto) annotations. In at least one embodiment, a polygon editing feature may be used to move vertices of a polygon to more accurate or fine-tuned locations.

In at least one embodiment, once customer dataset 1406 has associated ground truth data, ground truth data (e.g., from AI-assisted annotation, manual labeling, etc.) may be used by during model training 1214 to generate refined model 1412. In at least one embodiment, customer dataset 1406 may be applied to initial model 1404 any number of times, and ground truth data may be used to update parameters of initial model 1404 until an acceptable level of accuracy is attained for refined model 1412. In at least one embodiment, once refined model 1412 is generated, refined model 1412 may be deployed within one or more deployment pipelines 1310 at a facility for performing one or more processing tasks with respect to medical imaging data.

In at least one embodiment, refined model 1412 may be uploaded to pre-trained models 1306 in model registry 1224 to be selected by another facility. In at least one embodiment, his process may be completed at any number of facilities such that refined model 1412 may be further refined on new datasets any number of times to generate a more universal model.

FIG. 14B is an example illustration of a client-server architecture 1432 to enhance annotation tools with pre-trained annotation models, in accordance with at least one embodiment. In at least one embodiment, AI-assisted annotation tools 1436 may be instantiated based on a client-server architecture 1432. In at least one embodiment, annotation tools 1436 in imaging applications may aid radiologists, for example, identify organs and abnormalities. In at least one embodiment, imaging applications may include software tools that help user 1410 to identify, as a non-limiting example, a few extreme points on a particular organ of interest in raw images 1434 (e.g., in a 3D MRI or CT scan) and receive auto-annotated results for all 2D slices of a particular organ. In at least one embodiment, results may be stored in a data store as training data 1438 and used as (for example and without limitation) ground truth data for training. In at least one embodiment, when computing device 1408 sends extreme points for AI-assisted annotation 1210, a deep learning model, for example, may receive this data as input and return inference results of a segmented organ or abnormality. In at least one embodiment, pre-instantiated annotation tools, such as AI-Assisted Annotation Tool 1436B in FIG. 14B, may be enhanced by making API calls (e.g., API Call 1444) to a server, such as an Annotation Assistant Server 1440 that may include a set of pre-trained models 1442 stored in an annotation model registry, for example. In at least one embodiment, an annotation model registry may store pre-trained models 1442 (e.g., machine learning models, such as deep learning models) that are pre-trained to perform AI-assisted annotation on a particular organ or abnormality. These models may be further updated by using training pipelines 1304. In at least one embodiment, pre-installed annotation tools may be improved over time as new labeled clinic data 1212 is added.

Such components may be used to generate synthetic data imitating failure cases in a network training process, which may help to improve performance of the network while limiting the amount of synthetic data to avoid overfitting.

The systems and methods described herein may be used for a variety of purposes, by way of example and without limitation, for digital content creation and digital content production, game or application graphical output streaming, machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as cloud-hosted content streaming platforms, automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation and digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, content creation and production systems, systems for performing collaborative content creation for 3D assets, systems implemented at least partially using cloud computing resources, and/or other types of systems.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   identifying a plurality of buffers associated with an application processing a plurality of frames;
   generating a data structure for at least one buffer of the plurality of buffers;
   responsive to detecting a draw call directed to the at least one buffer of the plurality of buffers, updating a statistic of a plurality of statistics of the data structure corresponding to the at least one buffer, wherein the plurality of statistics includes at least one of: a draw call count, a viewport draw call count, or a matching draw data count; and
   for the at least one buffer, determining, based on a plurality of statistics of a corresponding data structure, a score reflecting a likelihood of the at least one buffer being associated with a specified buffer type.

2. The method of claim 1, further comprising:
   selecting, among the plurality of buffers, a buffer with a largest score reflecting a likelihood of the buffer being associated with the specified buffer type.

3. The method of claim 1, wherein determining the score reflecting the likelihood of the at least one buffer being associated with the specified buffer type further comprises:
   applying a weight coefficient of a set of weight coefficients to at least one statistic of the plurality of statistics of a respective data structure, wherein at least one weight coefficient reflects a degree of relevance of a respective statistic to identifying a specific type of buffer among the plurality of buffers; and
   obtaining a sum of the plurality of statistics.

4. The method of claim 1, further comprising:
   intercepting a command of the application to reuse the at least one buffer;
   generating a second data structure and associating the second data structure with a second instance of the at least one buffer;
   for at least one draw call directed to the second instance of the at least one buffer, updating a statistic of a plurality of statistics of the second data structure; and
   determining, for the second instance of the at least one buffer, a score reflecting a likelihood of the second instance of the at least one buffer being associated with a specified buffer type.

5. The method of claim 4, further comprising:
   comparing scores corresponding to existing instances of the plurality of buffers, wherein the scores include the score of the at least one buffer and the score of the second instance of the at least one buffer; and
   selecting, based on the comparing, an instance of the at least one buffer with a largest score.

6. The method of claim 2, further comprising:
   responsive to removal of the buffer identified as having the largest score, generating, for one or more buffers of a plurality of buffers associated with processing of a subsequent frame, a third data structure and associating the third data structure with the plurality of buffers remaining after the removal of the buffer identified as having the largest score;
   for each draw call directed to the plurality of buffers associated with the processing of the subsequent frame, updating, based on the draw call, a statistic of a plurality of statistics of the third data structure; and
   for the one or more buffers of the plurality of buffers associated with the processing of the subsequent frame, determining, based on a statistic of a corresponding third data structure, a score reflecting a likelihood of the one or more buffers associated with the processing of the subsequent frame being associated with a specified buffer type.

7. The method of claim 1, wherein the application is a main application and the data structure is generated for a secondary application.

8. The method of claim 1, wherein determining the score reflecting the likelihood of the at least one buffer being associated with the specified buffer type comprises:
   providing the plurality of statistics of the corresponding data structure as input to one or more trained machine learning models, at least one machine learning model of the one or more trained machine learning models being associated with a buffer type of one or more buffer types; and
   obtaining an output of the one or more trained machine learning models, at least one output indicating the score reflecting the likelihood of the at least one buffer being associated with the buffer type of the one or more buffer types.

9. The method of claim 8, wherein the one or more trained machine learning models are trained using training data that comprises, for at least one buffer type of the one or more buffer types, one or more metadata of a plurality of prior draw calls directed to a respective buffer and a corresponding label identifying a type of the respective buffer as the at least one buffer type.

10. A system comprising:
one or more processing units to:
identifying a plurality of buffers associated with an application processing a plurality of frames;
generating a data structure for at least one buffer of the plurality of buffers;
responsive to detecting a draw call directed to the at least one buffer of the plurality of buffers, updating a statistic of a plurality of statistics of the data structure corresponding to the at least one buffer, wherein the plurality of statistics includes at least one of: a draw call count, a viewport draw call count, or a matching draw data count; and
for the at least one buffer, determining, based on a plurality of statistics of a corresponding data structure, a score reflecting a likelihood of the at least one buffer being associated with a specified buffer type.

11. The system of claim 10, wherein the one or more processing units further:
select, among the plurality of buffers, a buffer with a largest score reflecting a likelihood of the buffer being associated with the specified buffer type.

12. The system of claim 10, wherein to determine the score reflecting the likelihood of the buffer corresponding to the respective data structure being associated with the specified buffer type, the one or more processing units further:
apply a weight coefficient of a set of weight coefficients to each statistic of the plurality of statistics of the respective data structure, wherein each weight coefficient reflects a degree of relevance of a respective statistic to identifying a specific type of buffer among the plurality of buffers; and
obtain a sum of the plurality of statistics.

13. The system of claim 10, wherein the application is a main application and the data structure is generated for a secondary application.

14. The system of claim 10, wherein to determine the score reflecting the likelihood of the buffer being associated with the specified buffer type, the one or more processing units further:
provide the plurality of statistics of the corresponding data structure as input to one or more trained machine learning models, each associated with a buffer type of one or more buffer types; and
obtain an output of the one or more trained machine learning models, each output indicating the score reflecting the likelihood of the buffer being associated with the buffer type of the one or more buffer types.

15. The system of claim 14, wherein the one or more trained machine learning models are trained using training data that comprises, for each buffer of the one or more buffers, one or more metadata of a plurality of prior draw calls directed to a respective buffer and a corresponding label identifying a type of the respective buffer.

16. The system of claim 15, wherein the system is comprised in at least one of:
a system for creating digital content creation;
a system for producing digital content;
a system for streaming content;
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

17. A non-transitory computer-readable storage medium comprising instructions that, when executed by a processing device, cause the processing device to perform operations comprising:
maintaining data structures for a plurality of buffers of a main application processing a plurality of frames;
monitoring at least one application programming interface (API) call from the main application directed to a buffer of the plurality of buffers; and
updating a statistic of a plurality of statistics of a data structure corresponding to the buffer, wherein the plurality of statistics includes at least one of: a draw call count, a viewport draw call count, or a matching draw data count.

18. The non-transitory computer-readable storage medium of claim 17, wherein the processing device is further to:
for each data structure associated with a buffer of the plurality of buffers, applying a weight coefficient of a set of weight coefficients to each statistic of the plurality of statistics of a respective data structure, wherein each weight coefficient reflects a degree of relevance of a respective statistic to identifying a specific type of buffer among the plurality of buffers;
obtaining a sum of the plurality of statistics of the respective data structure indicating a likelihood of a corresponding buffer being associated with the specified buffer type; and
selecting, among the plurality of buffers, a buffer corresponding with the data structure with a largest sum reflecting a likelihood of the buffer being associated with the specified buffer type.

* * * * *